(12) United States Patent
Tanaka et al.

(10) Patent No.: US 7,265,780 B2
(45) Date of Patent: Sep. 4, 2007

(54) IMAGE INFORMATION OBTAINING METHOD, IMAGE INFORMATION TRANSMITTING APPARATUS AND IMAGE INFORMATION TRANSMITTING SYSTEM

(75) Inventors: Hiroshi Tanaka, Asaka (JP); Jan Grönholm, Tampere (FI)

(73) Assignee: Fujifilm Corporation, Tokyo (JP)

( * ) Notice: Subject to any disclaimer, the term of this patent is extended or adjusted under 35 U.S.C. 154(b) by 849 days.

(21) Appl. No.: 09/784,159

(22) Filed: Feb. 16, 2001

(65) Prior Publication Data

US 2001/0041056 A1    Nov. 15, 2001

(30) Foreign Application Priority Data

Feb. 18, 2000    (JP) .............................. 2000-040590

(51) Int. Cl.
  *H04N 5/225*    (2006.01)
  *H04N 5/232*    (2006.01)

(52) U.S. Cl. .............................. 348/207.99; 348/211.2

(58) Field of Classification Search ........... 348/207.99, 348/207.1, 207.11, 207.2, 211.2, 211.3, 211.14, 348/333.07, 231.99, 231.2, 231.6, 231.7, 348/231.9, 211.99; 379/93.25; 455/556.1, 455/566, 90.1
See application file for complete search history.

(56) References Cited

U.S. PATENT DOCUMENTS

| 5,313,572 | A | | 5/1994 | Yamamoto et al. ......... 395/145 |
| 5,848,420 | A | * | 12/1998 | Xu ........................... 707/104.1 |
| 5,861,918 | A | * | 1/1999 | Anderson et al. ........ 348/231.9 |
| 5,899,581 | A | * | 5/1999 | Kawamura et al. ......... 386/120 |
| 5,943,093 | A | * | 8/1999 | Anderson et al. ........ 348/231.6 |
| 5,943,603 | A | | 8/1999 | Parulski et al. .............. 455/3.1 |
| 5,986,701 | A | * | 11/1999 | Anderson et al. ........ 348/231.6 |
| 5,999,697 | A | * | 12/1999 | Murase et al. ............... 386/101 |
| 6,038,295 | A | * | 3/2000 | Mattes ...................... 379/93.25 |
| 6,092,023 | A | * | 7/2000 | Kunishige ...................... 702/1 |
| 6,141,044 | A | * | 10/2000 | Anderson et al. ........ 348/231.6 |
| 6,249,316 | B1 | * | 6/2001 | Anderson .............. 348/333.05 |
| 6,507,363 | B1 | * | 1/2003 | Anderson et al. ........ 348/231.9 |
| 6,538,698 | B1 | * | 3/2003 | Anderson .............. 348/333.05 |

(Continued)

FOREIGN PATENT DOCUMENTS

EP    0 883 282    12/1998

(Continued)

OTHER PUBLICATIONS

European Search Report dated Apr. 2, 2003.

(Continued)

*Primary Examiner*—Vivek Srivastava
*Assistant Examiner*—Justin Misleh
(74) *Attorney, Agent, or Firm*—McGinn IP Law Group, PLLC

(57) ABSTRACT

A transmitting and receiving device capable of transmitting and receiving information to and from another communication apparatus and an information processing device are provided. The information processing device produces directories that classifies a plurality of images stored in a recording medium, and if the communication apparatus asks for an offer of any image file according to information of the directories, the information processing device transmits the image file to the communication apparatus through the transmitting and receiving device. Consequently, the user is capable of easily designating the desired image file that meets the use according to the presented information about the directories by remote control with the communication apparatus.

49 Claims, 18 Drawing Sheets

U.S. PATENT DOCUMENTS

| | | | |
|---|---|---|---|
| 6,704,047 B1 * | 3/2004 | Tsutsui | 348/231.7 |
| 6,784,925 B1 * | 8/2004 | Tomat et al. | 348/207.11 |
| 6,862,038 B1 * | 3/2005 | Anderson | 348/207.99 |
| 6,954,280 B1 * | 10/2005 | Kaibara | 358/1.15 |
| 7,193,646 B1 * | 3/2007 | Shioji | 348/220.1 |

FOREIGN PATENT DOCUMENTS

| | | |
|---|---|---|
| EP | 944247 A2 * | 9/1999 |
| JP | A-03-006192 | 1/1991 |
| JP | A-07-195756 | 8/1995 |
| JP | A-09-098367 | 4/1997 |
| JP | A-09-102922 | 4/1997 |
| JP | 9-135412 | 5/1997 |
| JP | 10-215397 | 8/1998 |
| JP | 10-308981 | 11/1998 |
| JP | 11-261717 | 9/1999 |
| JP | 11-355706 | 12/1999 |
| JP | 2001-111712 | 4/2001 |

OTHER PUBLICATIONS

Chinese Office Action dated Oct. 21, 2005 (with partial English translation).

European Office Action dated Feb. 6, 2006.

* cited by examiner

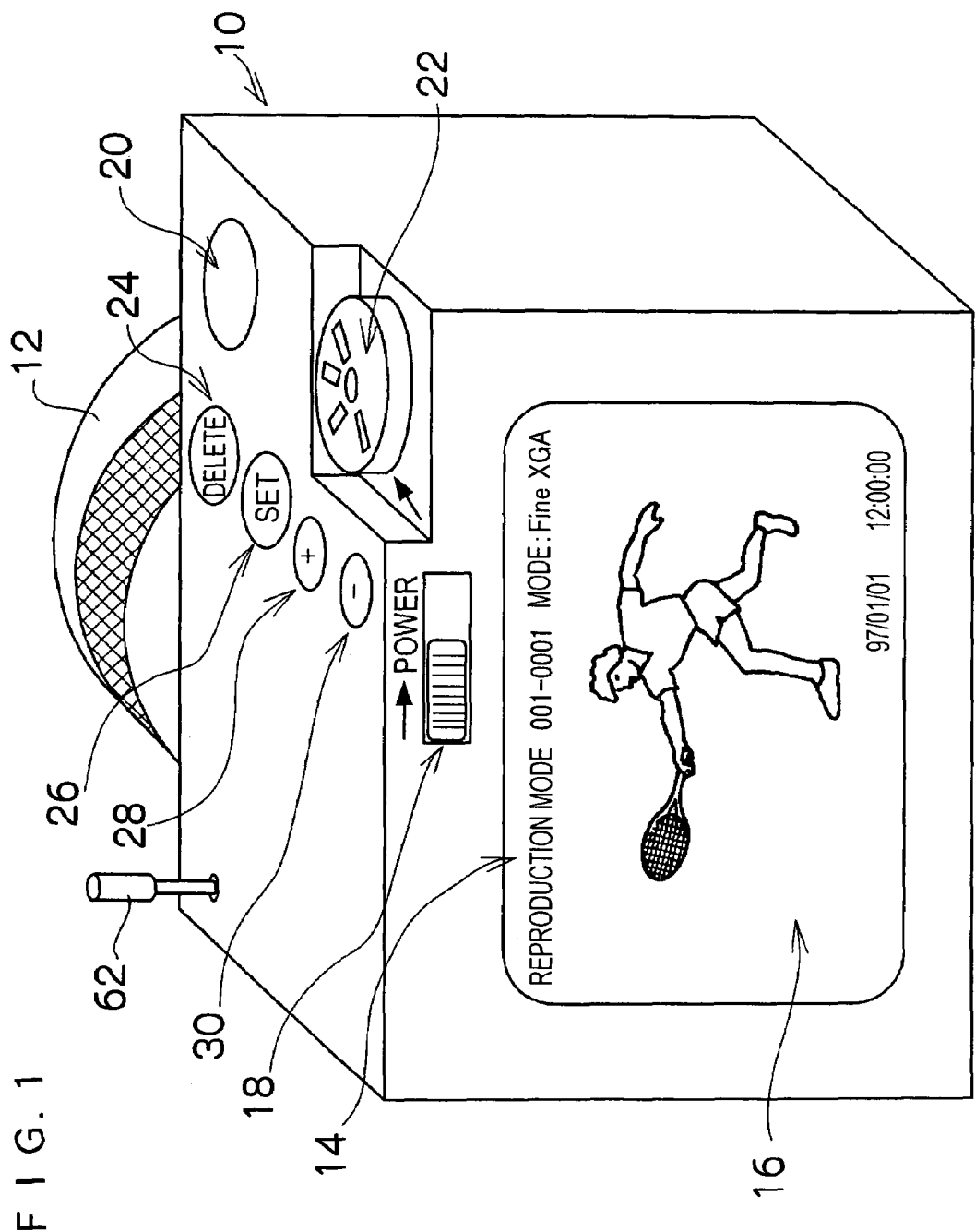

F I G. 2
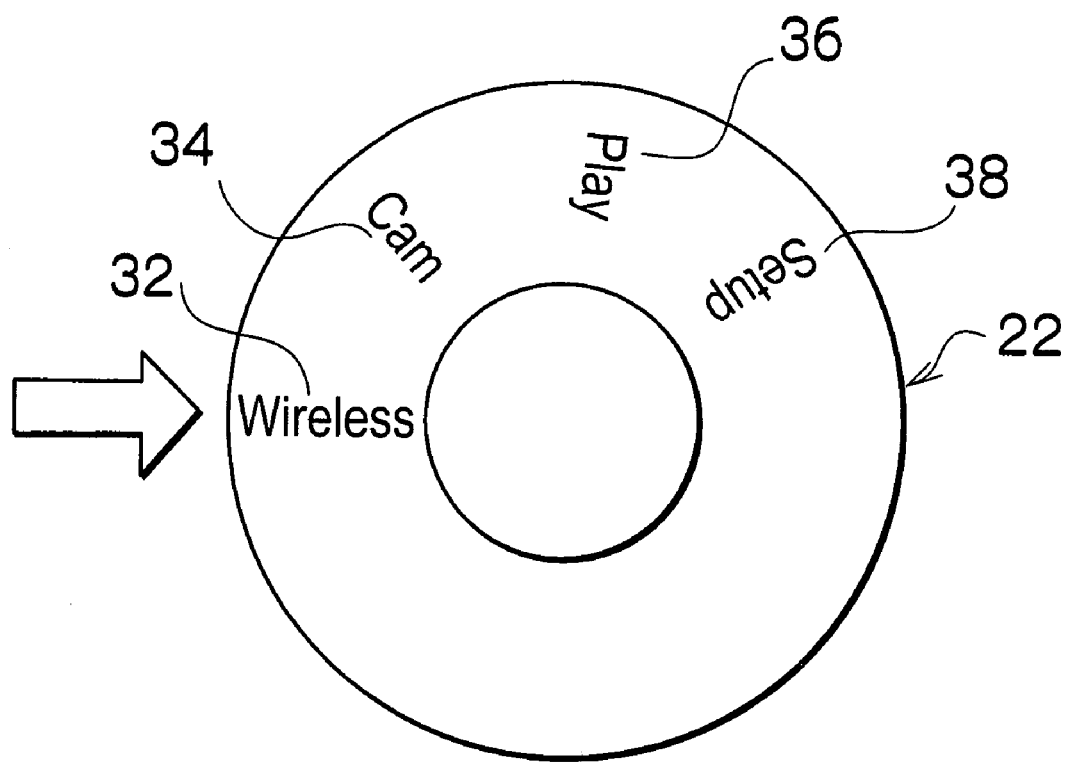

FIG. 4

SETUP

DATE/TIME: 99/12/14 12:00:00

SHOOTING MODE: FINE [NORMAL] ECONOMY

NUMBER OF PIXELS: VGA(640 x 480) [XGA(1024 x 768)]

AUTO-OFF: 2min

ALARM SOUND: LARGE [SMALL] NONE

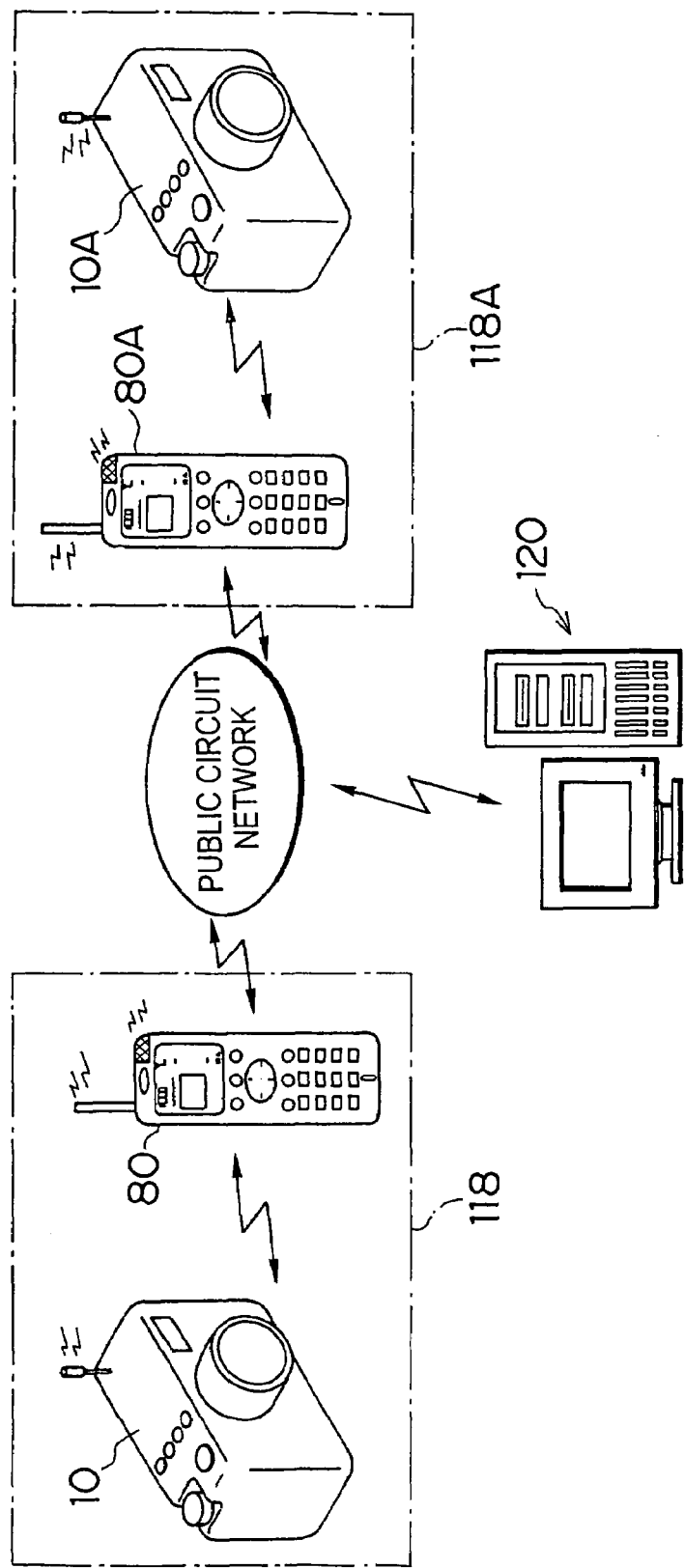
F I G. 7

F I G. 1 1

¥QQVGA¥001VACATION¥DSCF0001.JPG
¥QQVGA¥001VACATION¥DSCF0002.JPG
¥QQVGA¥001VACATION¥DSCF0003.JPG
¥QQVGA¥002BIRTHDAY¥DSCF0001.JPG
¥QQVGA¥002BIRTHDAY¥DSCF0003.JPG
¥QQVGA¥002BIRTHDAY¥DSCF0004.JPG

¥QVGA¥001VACATION¥DSCF0001.JPG
¥QVGA¥001VACATION¥DSCF0002.JPG
¥QVGA¥001VACATION¥DSCF0003.JPG
¥QVGA¥002BIRTHDAY¥DSCF0001.JPG
¥QVGA¥002BIRTHDAY¥DSCF0003.JPG
¥QVGA¥002BIRTHDAY¥DSCF0004.JPG

¥VGA¥001VACATION¥DSCF0001.JPG
¥VGA¥001VACATION¥DSCF0002.JPG
¥VGA¥001VACATION¥DSCF0003.JPG
¥VGA¥002BIRTHDAY¥DSCF0001.JPG
¥VGA¥002BIRTHDAY¥DSCF0003.JPG
¥VGA¥002BIRTHDAY¥DSCF0004.JPG

¥SVGA¥001VACATION¥DSCF0001.JPG
¥SVGA¥001VACATION¥DSCF0003.JPG
¥SVGA¥002BIRTHDAY¥DSCF0001.JPG

¥XVGA¥001VACATION¥DSCF0001.JPG
¥XVGA¥001VACATION¥DSCF0003.JPG
¥XVGA¥002BIRTHDAY¥DSCF0001.JPG

¥Property¥001VACATION¥DSCF0001.JPG
¥Property¥001VACATION¥DSCF0002.JPG
¥Property¥001VACATION¥DSCF0003.JPG
¥Property¥002BIRTHDAY¥DSCF0001.JPG
¥Property¥002BIRTHDAY¥DSCF0003.JPG
¥Property¥002BIRTHDAY¥DSCF0004.JPG

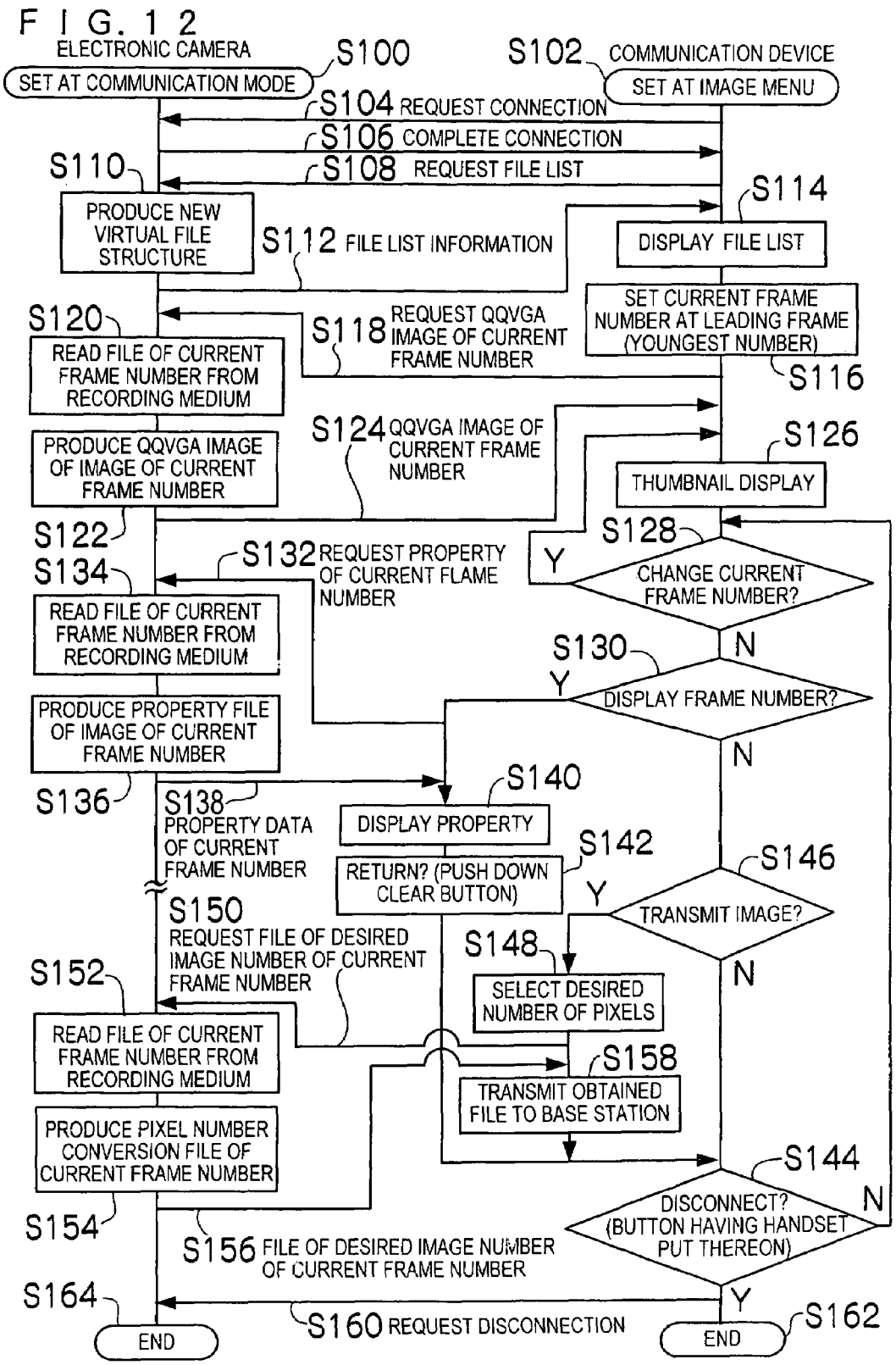

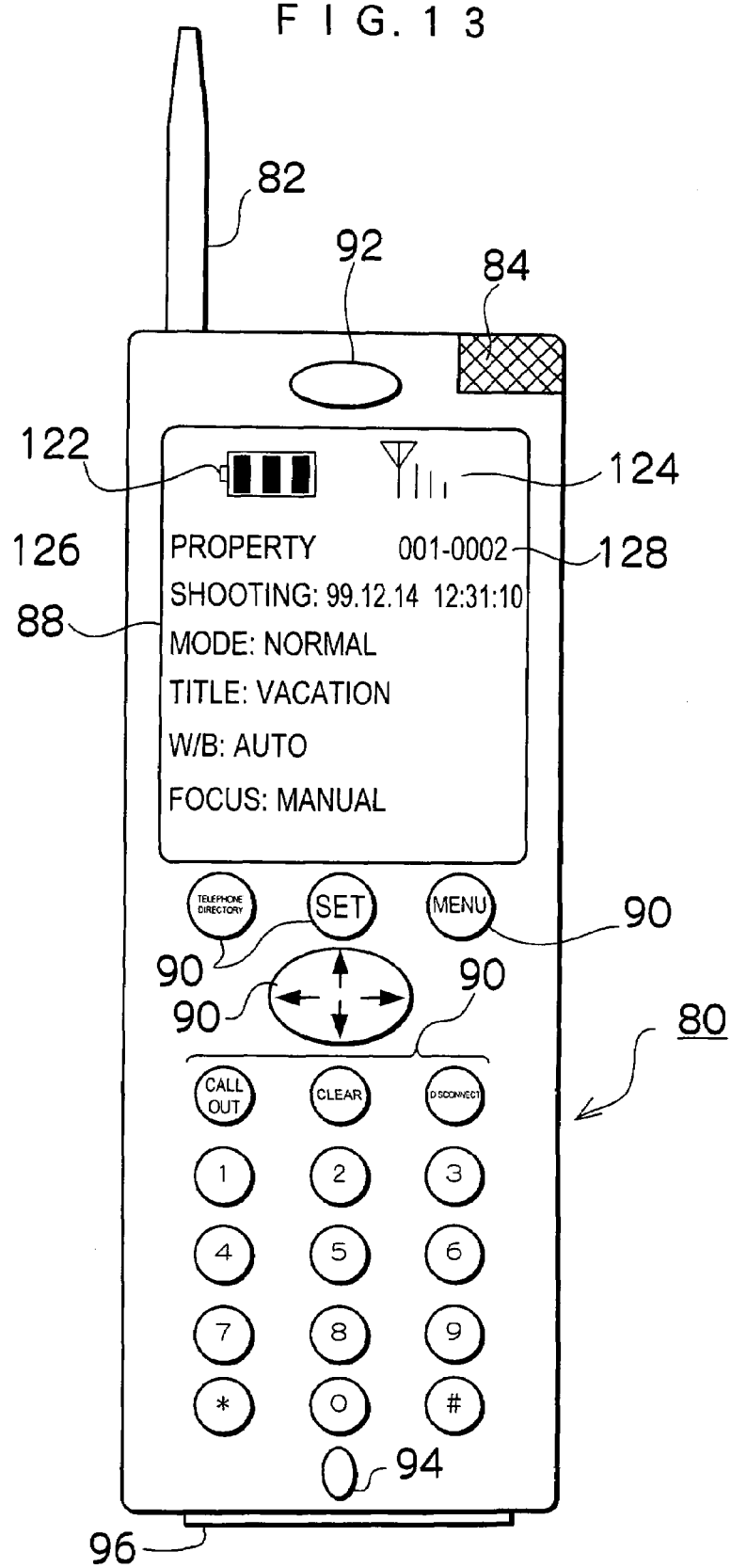

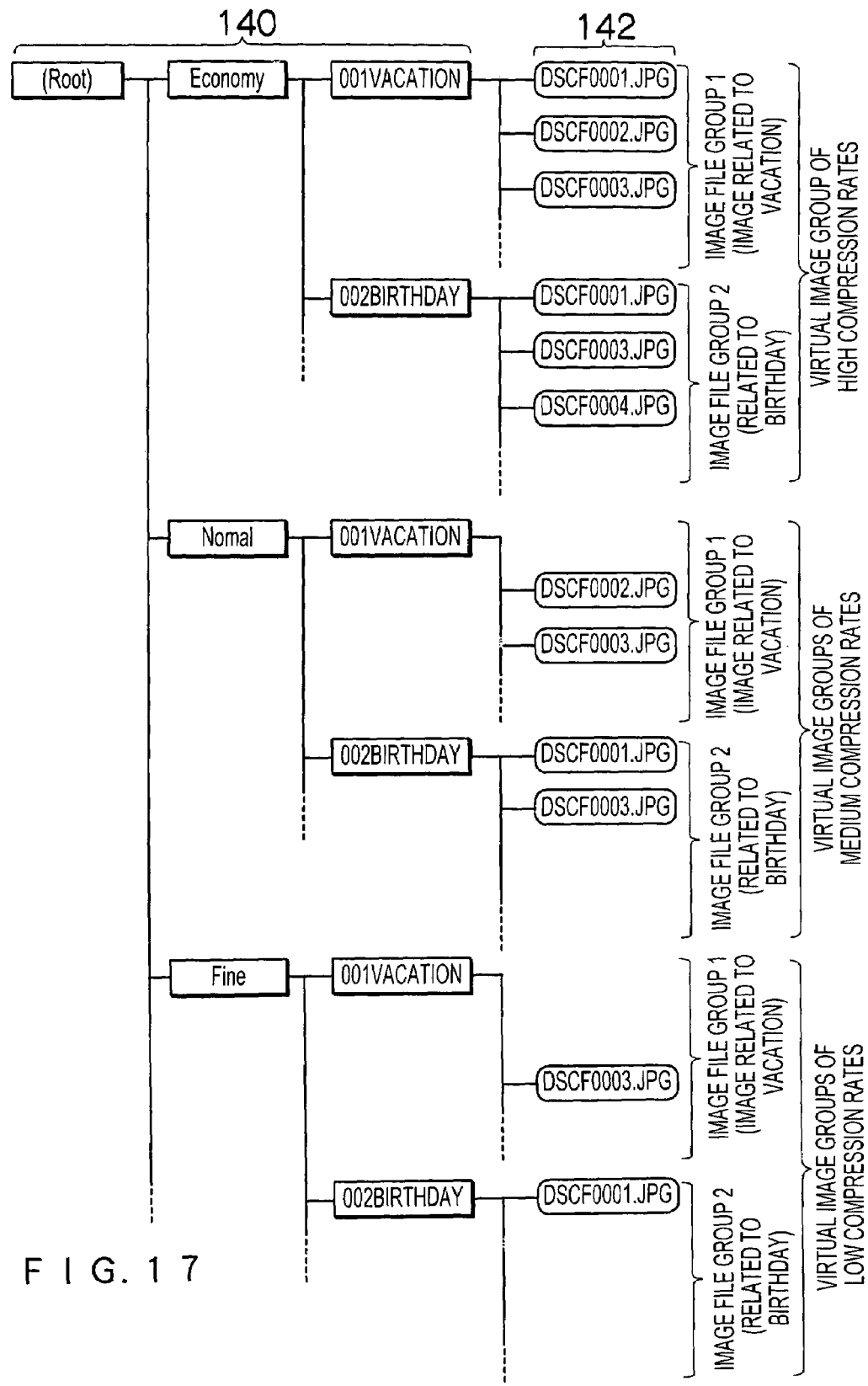
F I G. 1 7

IMAGE INFORMATION OBTAINING METHOD, IMAGE INFORMATION TRANSMITTING APPARATUS AND IMAGE INFORMATION TRANSMITTING SYSTEM

BACKGROUND OF THE INVENTION

1. Field of the Invention

The present invention relates to an image information obtaining method, an image information transmitting apparatus and an image information transmitting system, and particularly relates to an image information obtaining method, an image information transmitting apparatus and an image information transmitting system in a pull model in which a communication device receives and obtains image information from the image information transmitting apparatus.

2. Description of Related Art

Japanese Patent Application Laid-Open No. 10-215397 discloses a digital electronic camera having an image communication facility by which an image can be transmitted efficiently and reliably by making adaptations so that a recipient can also select the image to be transmitted.

In the wireless communication system of the digital camera shown in Japanese Patent Application Laid-Open No. 10-215397, part of image information (for example, an image called a thumbnail image) is displayed to a receiving end. A recipient can select an image to be received while seeing this display, but parameters representing properties of images such as image resolution and data compression rates cannot be converted in accordance with applications and transferred to a printer and the like. Also, in the case where all the image data can not be displayed on one screen on the liquid crystal monitor because the digital camera has stored, for example, ten or more kinds of image data, a process is required for switching the displayed image, thus causing a disadvantage that it takes much time when the recipient selects image data to be transmitted.

Japanese Patent Application Laid-Open No. 10-308981 discloses a wireless communication system of the digital camera in which by connecting a wireless communication terminal to the digital camera, image data stored in the digital camera is transmitted to the wireless communication terminal and is then stored in a memory portion temporarily, the image data to be transmitted is displayed on a liquid crystal monitor of the above described digital camera through a key button device of the wireless communication terminal and is then transmitted to establish connections to a wireless base station, and the image data is transmitted to a commercial network and the like.

With the wireless communication terminal described in Japanese Patent Application Laid-Open No. 10-308981, a user only selects the transmission mode of the image data through function keys, thus causing a disadvantage that the parameter representing the property of the image cannot be received in accordance with applications and transferred to other communication apparatuses.

SUMMARY OF THE INVENTION

The present invention has been made in view of these circumstances, with the objective of providing an image information obtaining method, an image information transmitting apparatus and an image information transmitting system that allow the user to easily select and designate a desired image file in accordance with a specific application by remote operation from an image information receiving apparatus on the basis of the information of directories presented by the image information transmitting apparatus.

In order to achieve the above-described object, the present invention is directed to an image information obtaining method in which an image information receiving end selects a desired image file according to information about directories presented by an image information transmitting end and receives an image of the selected image file, wherein: the image information transmitting end classifies a plurality of images recorded in a recording medium under parameters that represent properties of the plurality of images, produces directories to register image files or file names of the classified images in for each parameter and registers the file names required; and the image information receiving end selects a desired image file of a desired parameter according to the information about the produced directories and receives an image of the selected desired image file of the desired parameter from the image information transmitting end.

According to the present invention, the image information transmitting end classifies a plurality of images for each parameter representing the property of the image, produces directories to register image files or file names of the classified images for the each parameter, and registers the file names required, and the image information receiving end selects a desired image file of a desired parameter according to the information of the produced directories, and receives an image of the selected desired image file of the desired parameter from the image information transmitting end, thereby allowing the user to easily select and designate a desired image file in accordance with a specific application by remote operation from the image information receiving apparatus on the basis of the information of directories presented by the image information transmitting apparatus.

In order to achieve the above described object, the present invention is directed to an image information transmitting apparatus comprising: a directory producing device which classifies a plurality of images recorded in a recording medium under parameters that represent properties of the plurality of images, producing directories to register image files or file names of the classified images in for each parameter and registering the file names required; a communicating device capable of transmitting and receiving information to and from an image information receiving apparatus; and an information processing device which transmits, if the image information receiving apparatus asks for an offer of any image file produced by the directory producing device through the communicating device, an image of the image file to the image information receiving apparatus through the communicating device.

According to the present invention, a directory producing device for classifying a plurality of images recorded in record medium for each parameter representing the property of the image, producing directories to register image files or file names of the classified images, and registering the file names required, a communicating device capable of performing transmission and reception of information with the image information receiving apparatus, and an information processing device that, when it is requested from the image information receiving apparatus through the communication device that any image file produced by the directory producing device be provided, has images of the requested image file transmitted to the image information receiving apparatus through the communication device are provided, thus allowing the user to easily select and designate a desired image file in accordance with a specific application by remote operation from the image information receiving apparatus on the basis of the information of directories presented by the image information transmitting apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is an external perspective view of an electronic camera that is one form of an image information transmitting apparatus;

FIG. 2 shows displays of various kinds of modes provided for a mode switching dial;

FIG. 4 shows contents displayed when the electronic camera is placed in a setup mode;

FIG. 7 shows a configuration of connection of each communication device when information is transmitted and received using an image information obtaining system;

FIG. 11 shows a description state of the virtual directories and the virtual files shown in FIG. 10;

FIG. 12 shows processing procedures that the electronic camera and the communication device perform with each other;

FIG. 13 shows an example of display of property information;

FIG. 17 shows virtual directories and virtual files newly produced in accordance with the compression rate of image data in tree representation.

DETAILED DESCRIPTION OF THE PREFERRED EMBODIMENT

Figure 3:
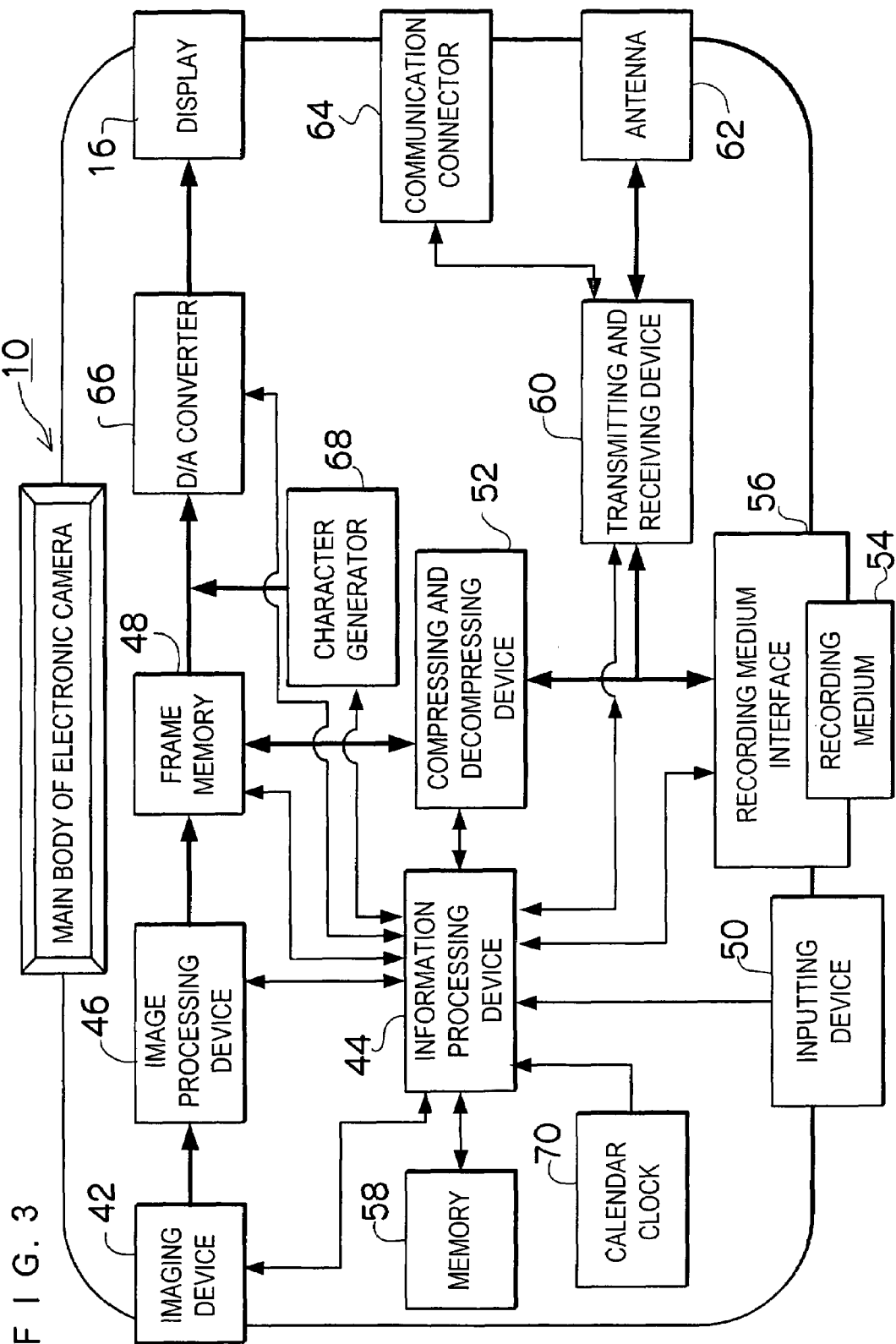
FIG. 3 is a block diagram of a signal processing system of the electronic camera.

A preferred embodiment of an image information transmitting apparatus, an image information obtaining system and an image information obtaining method related to the present invention will be described below according to the attached drawings.

FIG. 1 is an external perspective view of an electronic camera that is an embodiment of the image information transmitting apparatus.

According to FIG. 1, an electronic camera 10 is configured by a shooting lens 12 for forming an image of a subject on an imaging device, a display 16 for displaying various kinds of information such as image data and frame number display 14, a power switch 18 for inputting the start and stop of the function of the electronic camera 10, a release button 20 instructed by a user to perform shooting, a mode switching dial 22 for switching a various kinds of modes provided for the electronic camera 10 for setting, a delete button 24 to be designated when a desired item is deleted from items displayed on the display 16, a set button 26 for registering a desired item from items displayed on the display 16, an increment button 28 to be operated when frame numbers and the like displayed on the display 16 are increased, and a decrement button 30 to be operated when the frame numbers and the like displayed on the display 16 are decreased.

Also, in the case where transmission and reception of information such as image data with an external apparatus are performed by means of communication, an antenna 62 for transmitting and receiving carrier waves and data is provided.

FIG. 2 shows displays of various kinds of modes provided for the mode switching dial 22.

According to FIG. 2, the mode switching dial 22 is provided with a communication mode 32 (described as Wireless in FIG. 2) for performing communication with other communication devices (such as image information receiving apparatuses), a shooting mode 34 for performing shooting, a reproduction mode 36 for reproducing registered images, a setup mode 38 for setting dates, the number of captured pixels, the time of power auto-off, the volume of an alarm sound and the like.

FIG. 3 is a block diagram of a signal processing system of the electronic camera.

The electronic camera 10 is provided with an imaging device 42, which performs photo-electronic conversion of the image of a subject formed on a photo-receiving face and outputting it as image data, an information processing device 44 (including the function of a converted image producing device) for performing control of the entire electronic camera 10 and performing sampling timing control of image data, recording control of image data, communication control, display control, production of virtual directories, production of virtual files, number-of-pixels conversion processing of image data, a various kinds of conversion processing of image data, set and release of a power-conservation mode and the like, an image processing device 46 for performing processes such as change of the number of pixels, sharpness correction, gamma correction, contrast correction and white balance correction, a frame memory 48 storing image data temporarily, an inputting device 50 including the release button 20, the delete button 24, the set button 26, the increment button 28, the decrement button 30 and the like, a compressing/decompressing device 52 (including the function of the converted image producing device) performing compression control of information such as image data using a method represented by JPEG and MPEG, and performing a process of expansion development control of compressed data, and a recording medium interface 56 converting data to record image data in a detachable recording medium 54 and read out the image data. The recording medium 54 is a detachable recording device represented by semiconductors such as memory cards and MOs, magnetic recording and optical recording.

A memory 58 configured by a ROM storing therein operation programs and each constant and a RAM being a storing device that constitutes a work area when a program is run are connected to the information processing device 44.

A wireless communication device of the electronic camera 10 used when transmission and reception of the image data and the like with external devices are performed by means of communication is configured by a transmitting/receiving device 60 for transmitting or receiving image data on a carrier wave in accordance with a demand from the information processing device 44, an antenna 62 transmitting and receiving the carrier wave and image data, and a communication connector 64 for connecting together apparatuses performing transmission and reception of information such as image data with each other with a cable to carry out wired communication.

Also, the electronic camera 10 is provided with a D/A converter 66 for displaying image data on the image display 16, a character generator 68 converting code information commanded from the information processing device 44 into the data of characters and messages to be displayed, and a calendar clock 70 ticking dates and time.

Furthermore, when a command to inquire the directory structure and file information of image data in relation to the transfer of image data is received from another communication device (such as an image information receiving apparatus) by communication, the information processing device 44 newly produces a virtual directory (including a virtual folder) and a virtual image file that constitutes classification information based on an image file recorded in the recording medium 54.

A displayed content that is displayed on the display 16 when the mode of the electronic camera 10 is set to the setup mode 38 is shown in FIG. 4.

According to FIG. 4, when the setup mode 38 is set, display is made for change of dates and time, change of the shooting mode, change of the number of recorded pixels, setting of auto-off time and volume control of an alarm sound.

These settings can be changed by operating the inputting device 50 provided for the electronic camera 10.

Furthermore, the display of a date and time represents the date and time which the calendar clock 70 is currently ticking, and when the user performs selection for changing numeric values to change numeric values, the information of the an inputted date and time is transferred from the information processing device 44 to the calendar clock 70 to start ticking the inputted date and time.

For the shooting mode displayed on the display 16, various shooting modes of "FINE", "NORMAL" and "ECONOMY" different from each other in image data compression rates, and in the case of an example in FIG. 4, the "FINE" mode represents a setting of low compression rate with data volume of the image being highest.

For the number of recorded pixels, the numbers of pixels (resolutions) of VGA (640×480) and XGA (1024×768) are shown. Thus, when high image quality print is performed, a record is made in advance with the number of pixels being large and the compression rate being low. Also, recording is performed with the number of pixels being small and the compression rate being high in the case where image data is used for an application such as transfer to another communication device and so forth, that is, in the case where an application is defined in advance, the volume of image data is set in accordance with the application.

Also, the auto-off time represents a setting of timeout time for automatically entering the power-conservation mode (for example, modes for reducing the process speed of the information processing device 44 and stopping power supply to peripheral elements not to be used) after the passage of time set to prolong the lifetime of a battery. When the power-conservation mode is set and the electronic camera 10 is activated with the electronic camera 10 being in the power-conservation mode, it is activated by the user operating any of the inputting device 50, or transmitting a command to expedite the activation through communication from another communication device. The power-conservation mode setting device for setting and releasing this power-conservation mode may be performed by the information processing device 44, or independent power-conservation mode may be provided for exclusive use.

In setting of alarm sound, the volume of beep sound when an alarm is given to the user at the time of activating the electronic camera 10, at the end of the communication process, during photo shooting and so forth. Each information of the date and time, the shooting mode and the number of recorded pixels is displayed together with the image when reproduction is performed as shown in the display 16 of FIG. 1.

The photo shooting process of the electronic camera 10 configured as described above will be described.

A subject image to be imaged is formed on the light-receiving face of the imaging device 42, the formed subject image undergoes photo-electronic conversion to be outputted to the image processing device 46. The resulting image data is subjected to amplification and noise reduction processing at the image processing device 46, and is temporarily stored in the frame memory 48. The information processing device 44 transfers the image data stored in the above described frame memory 48 to the D/A converter 66 one after another to display the same on the display 16.

A push of the release button 20 provided for the inputting device 50 leads to entrance to a mode of shooting a subject. Then, the information processing device 44 transfers image data stored in the frame memory 48 to the compressing/decompressing device 52 and outputs a command to perform compression of the image data on a predetermined condition. And, it carries out processing to record in succession the image data in the recording medium 54 for the recording medium interface 56.

Also, when the mode switching dial 22 is turned to the communication mode 32 and a transmission button defined as the inputting device 50, the information processing device 44 reads the designated image data in succession from the recording medium 54 or the frame memory 48 and converts the image data into a predetermined data format, followed by carrying out processing to transmit the data to the outside through the transmitting/receiving device 60 and the antenna 62 or the communication connector 64.

When transmission and reception of information with another communication device through the antenna 62 are performed, the above described information is converted into a radio signal or an optical signal to perform wireless communication. Also, when transmission and reception of information with another communication device are performed through the connector 64, the apparatuses performing transmission and reception of the above described with each other are connected with a cable, and the above described information is converted into an electric signal or an optical signal to perform wired communication.

Figure 5:
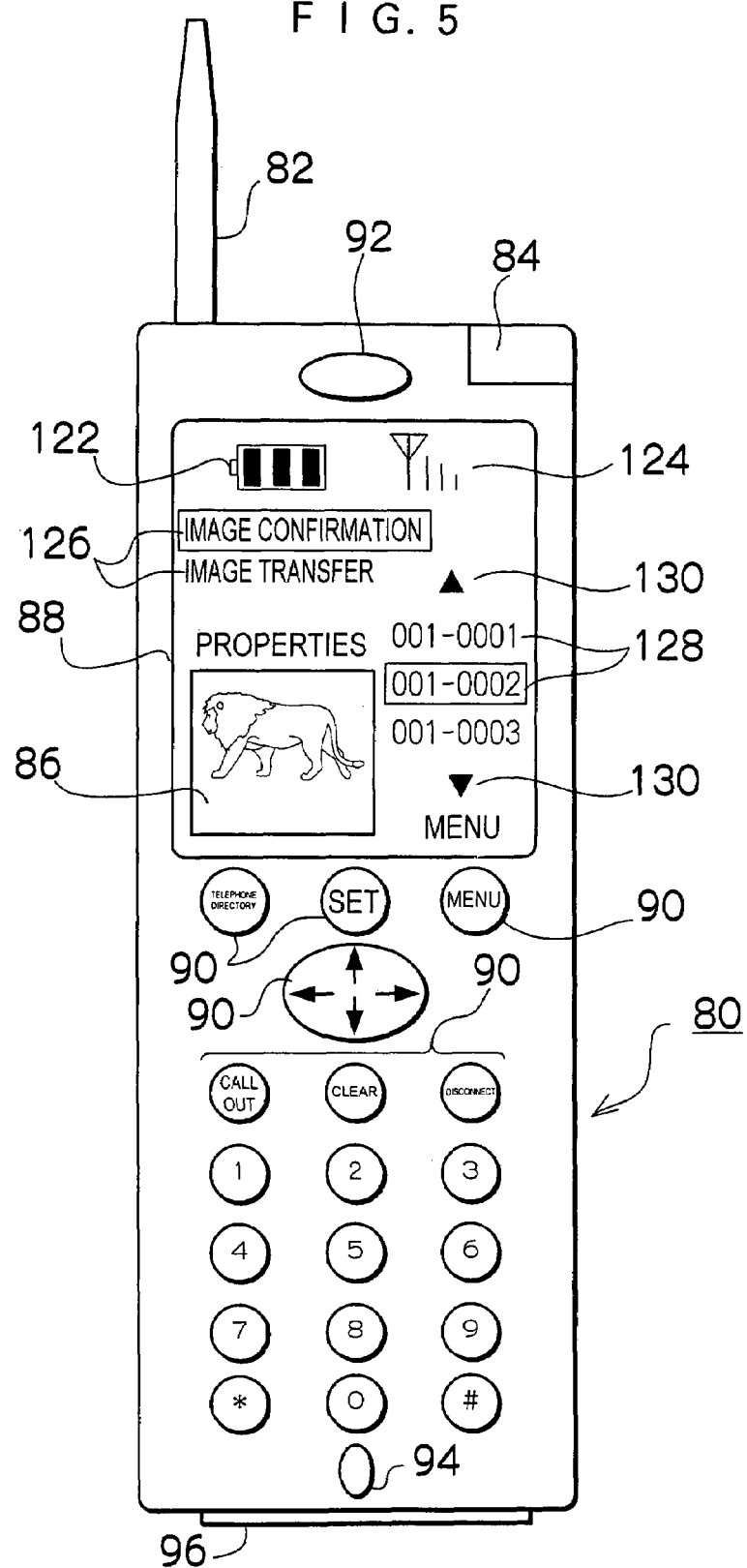
FIG. 5 is an external view of a communication device.

FIG. 5 is an external perspective view of the apparatus (image information receiving apparatus).

As shown in FIG. 5, the communication device 80 is configured by an antenna 82 for performing wireless communication with a public circuit, a wireless communication device 84 for performing wireless communication with other peripheral communication devices such as image information transmitting apparatuses, a display 88 configured by a color liquid crystal display and the like for displaying a thumbnail image 86 of communication information and a selected image file, designating devices 90, 90 . . . for designating and selecting data of telephone numbers, letters, images and sounds, and designating an output apparatus, addresses of the above described data, a speaker 92 outputting a sound as soon as it becomes a handset, a microphone 94 for inputting sounds and a communication connector 96 for performing wired communication with other peripheral communication devices such as image apparatuses. Furthermore, the communication device 80 may be an apparatus having the above described functions added to a cellular telephone.

Also, according to FIG. 5, a battery remaining capacity display 122 indicating the remaining capacity of the battery that is a power source of the communication device 80 and a receive radio intensity display 124 displaying the intensity of wireless receive radio are displayed on the menu of the display 88. Also, run mode display 126, 126 . . . such as an image confirmation menu for displaying a designated image on the entire surface of the display 88 to confirm the content of the image, an image transfer menu for transmitting the image from the communication device 80 further to another communication device through the public circuit and the like and an image attached information menu (property menu) for confirming attached information of the image, image directory file names 128, 128 . . . to be selected, and pointers 130, 130 . . . for scrolling and displaying non-displayed image directory file names existing in the upper or lower part are displayed.

When the user designates the run mode and the image directory file, a designation frame is moved to perform setting using cursor keys and the like provided for the designating device 90. For the mode of image confirmation, as shown in FIG. 5, an image directory file name 128 is displayed as "001-0002". In the case of this example, the leading three digits "001" represent a directory name and the latter four digits represent a file name. In this way, the image file name is represented as the image directory file name 128, thereby making it possible to uniquely designate the image file recorded in the recording medium 54.

Figure 6:
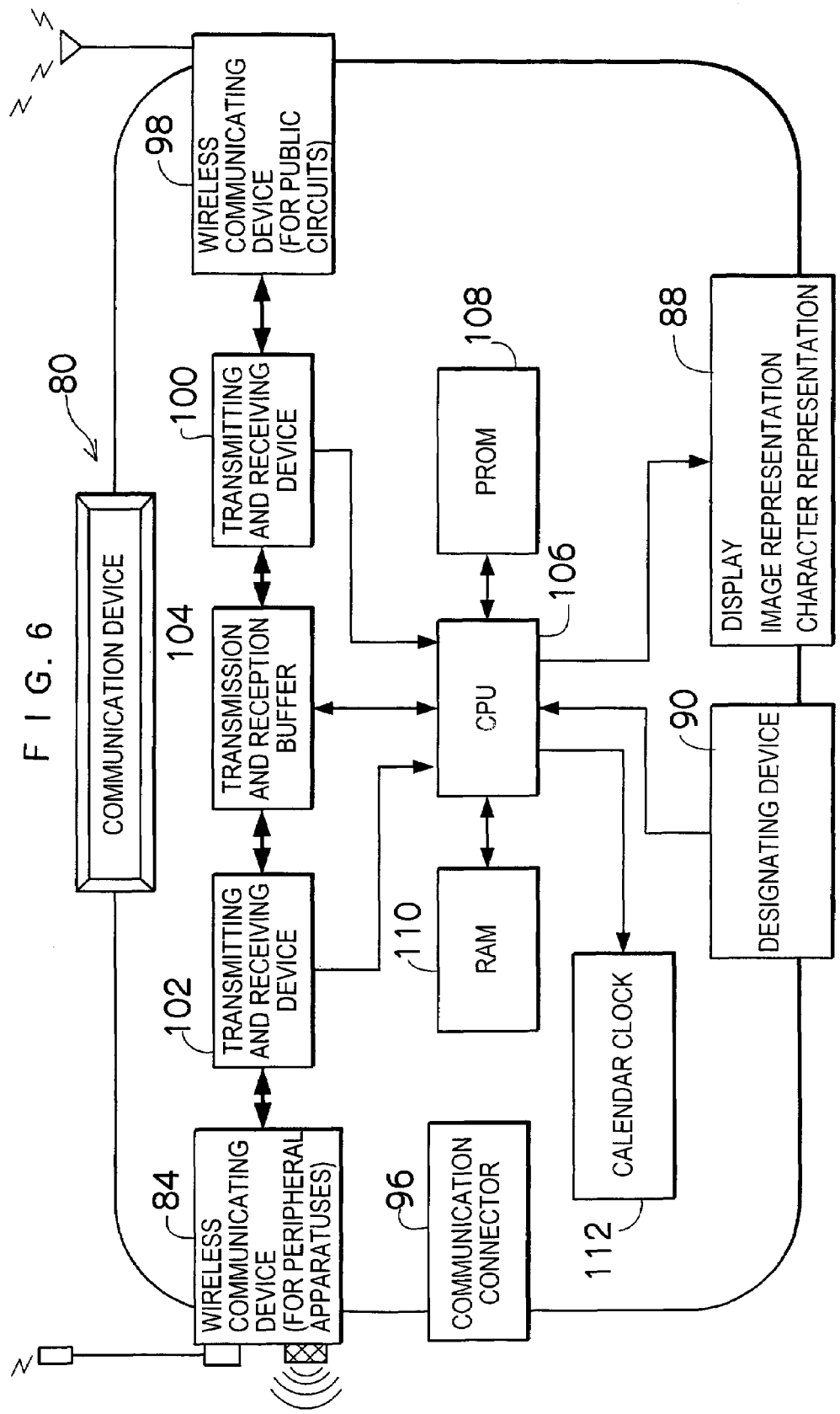
FIG. 6 is a block diagram of a communication processing system of the communication device.

FIG. 6 is a block diagram of the communication system of the communication device.

According to FIG. 6, the transmitting and receiving portion of the communication device 80 is configured by a public circuit wireless communication device 98 for performing wireless communication with the public circuit transmitting and receiving device 100, the wireless communication device 84 for performing communication with other communication devices, a communication connector 96 connecting a communication cable, a transmitting and receiving device 102, and a transmission and reception buffer 104 for temporarily storing data to be transmitted and received in real time.

Also, the communication device 80 is provided with a CPU 106 performing control of the entire apparatus, a PROM 108 in which a program to operate the CPU 106, various kinds of constants, telephone numbers, addresses of communication partners and the like are written, a RAM 110 being a storing device that constitutes a work area when the CPU 106 carries out processing, and a calendar clock 112 ticking dates and time.

The CPU 106 in the communication device 80 and each peripheral circuit including the display 88 and the designating device 90 are connected by communicating means such as a bus line and I/O, and the CPU 106 can control each peripheral circuit.

The communication device of the wireless communication device 84 and the electronic camera 10 is a communicating device using the light of radio waves, ultrasonic waves, infrared rays and the like in the carrier wave. In the case where the radio wave is used, specifications of "Bluetooth" and wireless LANs (Local Area Networks) that have recently received attention may be adhered to, and in the case where the infrared ray is used, an interface device based on the specification of IrDA may be used.

Also, for the communicating device in the case where communication is performed using wired communication device, a serial communicating device such as RS-232, RS-422 and USB may be used, and the interface device by parallel signals may be used.

FIG. 7 shows configurations of connection of various kinds of communication devices in the case where information is transmitted and received using an image information obtaining system.

As shown in FIG. 7, the image information obtaining system 118, 118A is configured by the electronic camera 10, 10A and the communication device 80, 80A. the user operates the communication device 80, 80A to select and designate images captured or stored by the electronic camera 10, 10A to read out the images, and transmits the images to a desired server 120 and other communication devices (not shown) through the network of the public circuit. This server 120 may perform a service to print the images on sheets of paper based on the transmitted image information and deliver them to the user.

Figure 8:
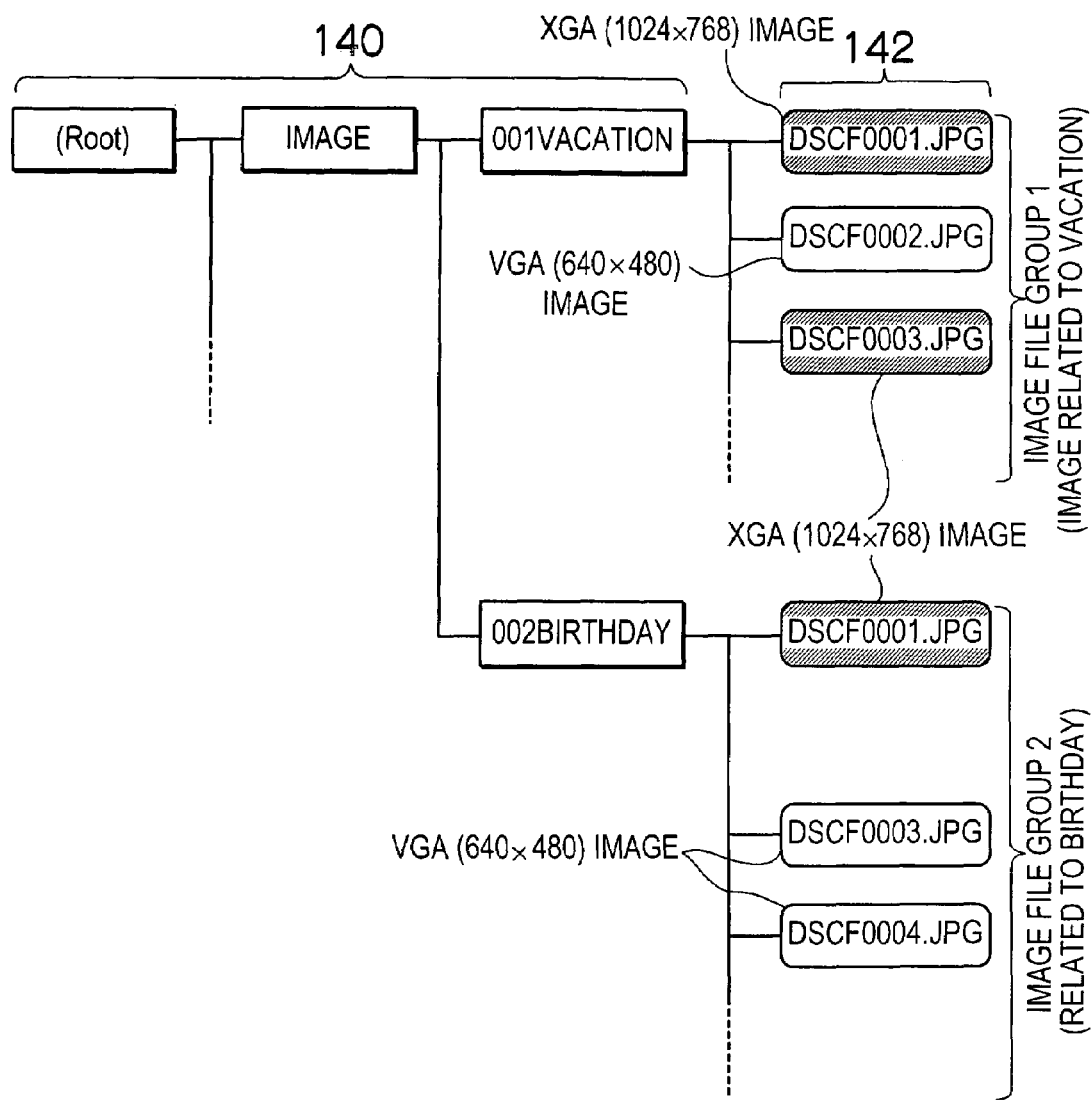
FIG. 8 shows a directory structure with respect to original image files recorded in a recording medium of the electronic camera.

A directory structure concerning the original image file recorded in the recording medium 54 of the electronic camera 10 is shown in FIG. 8.

According to FIG. 8, the directory structure with respect to the image file is configured by each directory group 140 of "ROOT", "IMAGE" representing image data, and segments "001VACATION" representing images captured by the user during his or her vacation and "002BIRTHDAY", and each image file group 142 of "DSCF0001.JPG", "DSCF0002.JPG" . . . .

The image directory file name 128, "001-0002" displayed on the display 88 in FIG. 5 as described above represents a file "DSCF0002.JPG" stored in the lower hierarchy of the directory "001VACATION". Also, the image files, "DSCF0001.JPG" and "DSCF0003.JPG" in the lower hierarchy of the directory "001VACATION" shown in FIG. 8 are image files recorded with the number of pixels (resolution) of XGA (1024×768), and DSCF0002.JPG" is an image file recorded with the number of pixels of VGA (640×480).

In a similar way, the image file, "DSCF0001.JPG" in the lower hierarchy of the directory "002BIRTHDAY" is an image file recorded with the number of pixels of XGA (1024×768), and other image files are image files recorded with the number of pixels of VGA (640×480). In this way, by placing various kinds of image files different from each other in the number of pixels under the same directory, automatic production and retrieval of file names can be easily performed.

Figure 9:
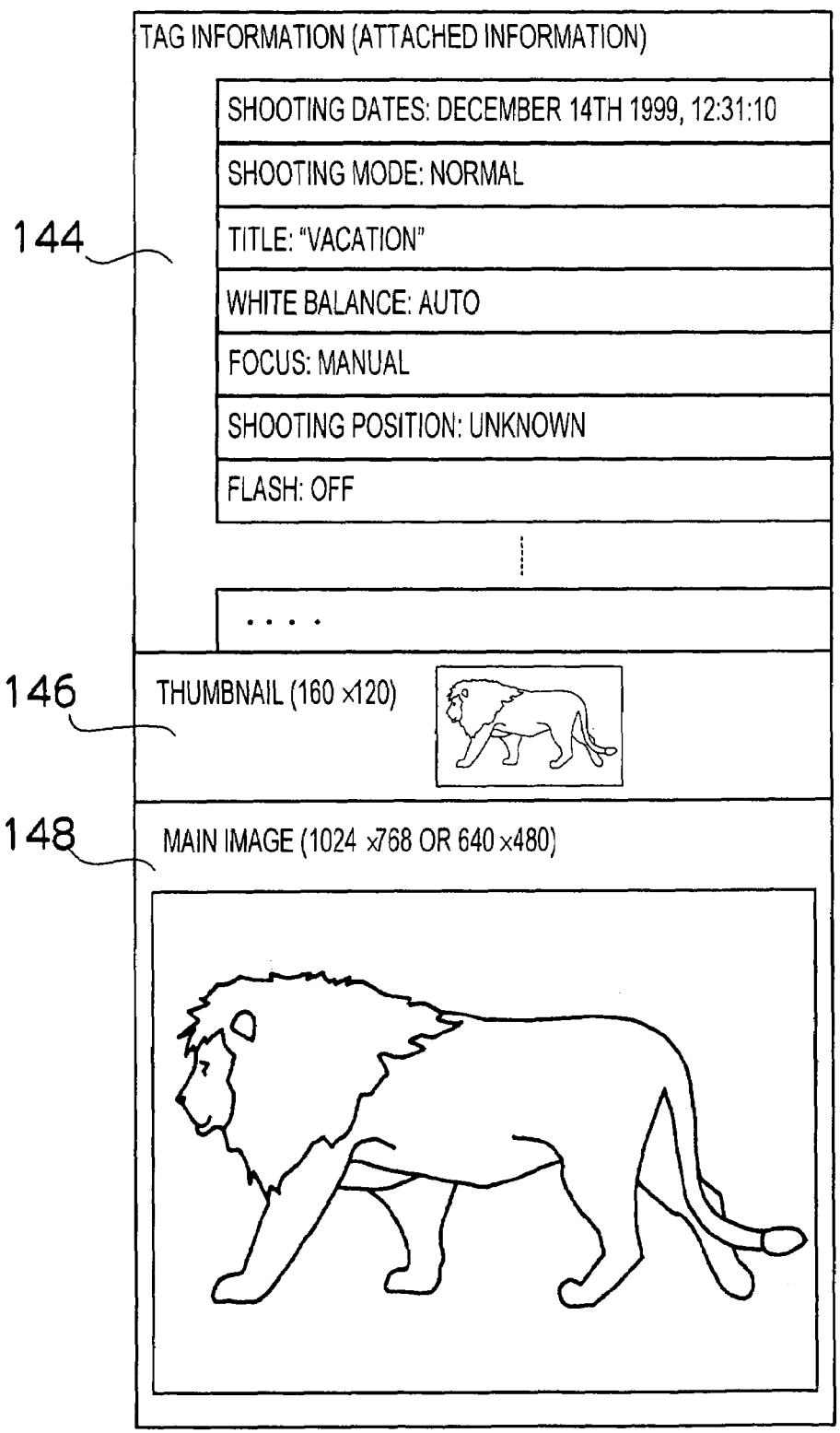
FIG. 9 shows an internal structure of an image file.

FIG. 9 shows an internal structure of the image file.

According to FIG. 9, the image file is configured by a tag 144 in which image attached information (property information) such as shooting conditions is described, a thumbnail 146 being image data for headlines, and a main image 148. In the tag 144, attached information of image data such as shooting dates, shooting modes, titles, white balance information, focus information, shooting position information obtained when GPD apparatuses, etc. are connected, and flash usage information. In the case where values of the respective information are unknown, it is also possible to describe "UNKNOWN" as shown in FIG. 9.

The thumbnail 146 has image data of the main image 148 (each number of pixels of VGA and XGA) whose number of pixels is reduced to about 160×120 for use as a headline attached thereto and stores the same. Each designated number of pixels of VGA, VGX and the like, information of image data compressed at a predetermined compression rate are recorded in the main image 148. Furthermore, the thumbnail 146 is not limited to the form shown in FIG. 9, but may have two or more sheets of image information different from each other in the number of pixels recorded therein.

Figure 10:
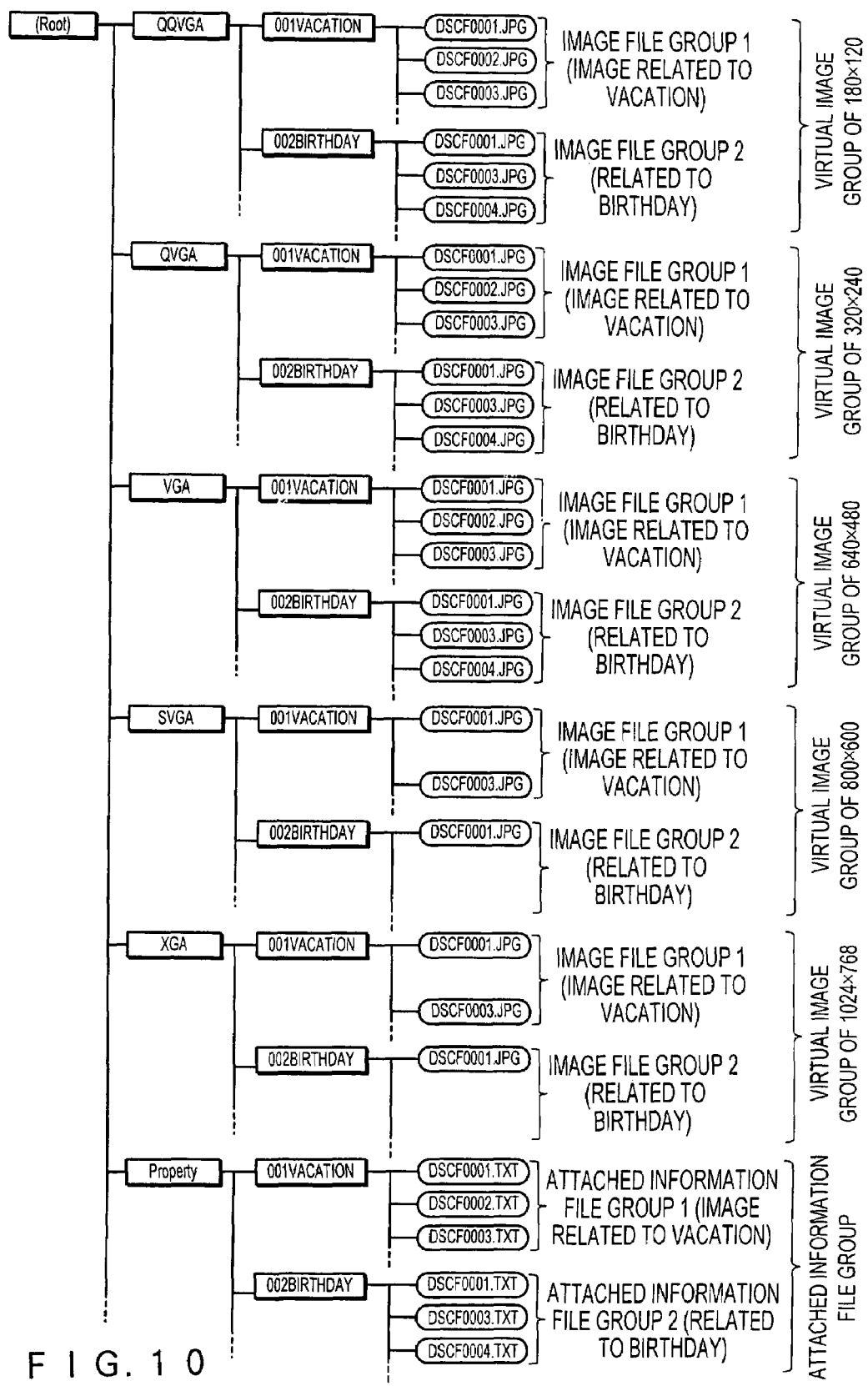
FIG. 10 shows paths of virtual directories and virtual files newly produced by category in accordance with the number of pixels of images, with a tree structure.

FIG. 10 shows the path of virtual directories and virtual files, which the directory producing device newly produces by category in accordance with the number of pixels of the image, using a tree structure.

When the image information transmitting apparatus receives a command to require the directory structure of the image data with respect to transfer of the image data from another transmitting apparatus, the information processing device 44 (a directory producing device) produces and registers the virtual directories and the virtual files for each parameter (category) representing the property of the image.

According to FIG. 10, a virtual directory "QQVGA" storing a series of virtual image files with the size of 1/16 VGA, a virtual directory "QVGA" storing a series of virtual image files with the size of ¼ VGA, a virtual directory "VGA" storing a series of virtual image files with the size of VGA, a virtual directory "SVGA" storing a series of virtual image files with the size of SVGA, a virtual directory "XGA" storing a series of virtual image files with the size of XGA, and a virtual directory "Property" storing a text data files concerning the content of tag information are newly classified by category, produced and registered in the lower hierarchy of the directory "ROOT".

Also, in the lower hierarchy of each of the newly produced directories, directories "001VACATION" and "002BIRTHDAY" classified by the user are newly produced. And, in the lower hierarchy of each of the directories "001VACATION" and "002BIRTHDAY", virtual image files "DSCF0001.JPG", "DSCF0002.JPG", "DSCF0003.JPG" . . . based on the original image files recorded are further produced and registered. These virtual directories and virtual files are directories and file names that do not exist in reality, but if the processing speed of the information processing device 44 is high and the recording medium 54 has sufficient space, image files with the number of pixels converted may be produced from original image files and recorded with the directory structure shown in FIG. 10.

As shown in FIG. 10, the virtual file "DSCF0002.JPG" does not exist in the directory "001VACATION" in the hierarchy below the virtual directory "SVGA". This is for the purpose of preventing consciously files and file names of the image size (the number of pixels) bringing about higher volume of data than original image data from being produced and registered, because the image file recorded when photo shooting is performed is image data of the VGA size (the image file "DSCF0002.JPG" in the directory "001VACATION" is recorded in the VGA size, as shown in FIG. 5), and therefore converting the image data of the VGA size into that of SVGA size all the way to increase the volume of the image data and sending the image data when the image data is transmitted through communication results in waste. Thus, in a similar way, the virtual file of the image file recorded in the VGA size is not produced in the directory "XGA".

Description status of the virtual directories and the virtual files shown in FIG. 10 are shown in FIG. 11.

Newly produced virtual directories and virtual files are described in the form shown in FIG. 11. The symbol "¥" is a symbol representing the path of directories to files, which is not particularly limited to "¥" and may be described using "/", etc. in stead of "¥".

Processing procedures of communication that the electronic camera 10 and the communication device 80 perform with each other are shown in FIG. 12.

The communicating method shown in FIG. 12 is a pull model in which the user can operate the communication device 80 (for example, a cellular telephone that is frequently carried) to easily obtain an image recorded in the electronic camera 10.

As shown in FIG. 12, when the operation mode of the electronic camera 10 is set at the communication mode at Step S100 "Set at Communication Mode" (hereinafter, described like S100 for short", and the operation mode of the communication device 80 is set at the image menu at S102 (Set at Image Menu), the communication device 80 transmits a command of S104 "Request Connection" to the electronic camera 10. Then, the electronic camera 10 receives the "Request Connection" command, and transmits a response to perform communication connection subsequently to the communication device 80 at S106 "Complete Connection". Furthermore, if the electronic camera 10 is in the power-conservation mode, after receiving information of the above described "Request Connection", the electronic camera 10 automatically releases the power-conservation mode to perform subsequent communication processing.

When the connection of communication is completed, the communication device 80 transmits a command of acquisition of file list information to the electronic camera 10 at S108 "Request File List".

When the electronic camera 10 receives a command of "Request File List", processing at S110 "Produce New Virtual File Structure" is performed. Here, the information processing device 44 newly produces file list information of the virtual directory and virtual image file structure shown in FIG. 11 based on the image file recorded in the recording medium 54, and transmits and presents the file list information classified and produced by category at S112 "File List Information" to the communication device 80.

The communication device 80 displays (browses) file list information based on the received file list information (information of directories) at S114 "Display File List". This file list information to be displayed may also be a file list display by characters, or tree representation of virtual image files as shown in FIG. 10.

For example, the communication device 80 performs display (browsing) shown in the display 88 of FIG. 5, and the user designates the mode of "Transfer of Image" and the image directory file name 128 "001-0002" (current frame number) at S116 "Set Current Frame Number at Leading Frame (Youngest Number)". Then, the communication device 80 transmits "Request QQVGA Image of Current Frame Number" to the electronic camera 10 at S118 "Request QQVGA Image of Current Frame Number".

In the electronic camera 10, processing to read the image file designated by the user from the recording medium 54 is performed at S120 "Read File of Current Frame Number from Recording Medium". Next, the information processing device 44 of the electronic camera 10 performs processing to read image data from the read image data and produce image data of the QQVGA size at S122 "Produce QQVGA Image of Image of Current Frame Number". Furthermore, at this time, if the image size (QQVGA size) designated from the communication device 80 is identical to the thumbnail image size of the original image file recorded in the recording medium 54, the image data of the designated QQVGA size is not produced consciously, but the recorded thumbnail image data is read out and transmitted.

The QQVGA image data of the current frame obtained as described above, is transmitted to the communication device 80 at S124 "QQVGA Image of Current Frame Number". At S126 "Thumbnail Display", the QQVGA image or the thumbnail image is displayed on the display 88. In this way, the display 88 of the communication device 80 is provided with display of the thumbnail image 86 shown in FIG. 5.

At S128 "Change Current Frame Number?", an inquiry is made to the user about whether or not a current frame number is changed. If the user changes the current frame number at S128, a return to S126 is made. Also, if the user does not change the current frame-number, advancement to S130 "Display Property? " is made.

At S130, whether or not display of properties concerning the image file of the current frame number is performed is determined. If the user designates the performance of display of the properties, transmission of the directory of the current frame and file name information, and request of the property of the file are transmitted to the electronic camera 10 at S132 "Request Property of Current Frame Number" to obtain property information (from the directory below ¥ROOT¥Property).

In the electronic camera 10, the request of properties of the current frame number is received, and processing to read the tag information of the designated image file from the recording medium 54 is carried out at S134 "Read File of Current frame Number from Recording Medium". At subsequent S136 "Produce Property File of Image of current Frame Number", property information is produced from the information of the read image file, and a property file, a file name and a property directory are produced and registered.

At S138 "Property Data of Current Frame Number", the electronic camera 10 transmits the data of the property file of the current frame number to the communication device 80. At S 140 "Display Property", the property information received by the communication device 80 is displayed on the display 88.

An example of property information is shown in FIG. 13.

According to FIG. 13, the run mode display 126 representing "Property Display Mode", a selected image directory file name 128 "001-0002", information of shooting dates and time of the image file, shooting mode information, title information, information regarding white balance, and shooting information regarding the focussing device are displayed on the display 88 of the communication device 80. Furthermore, in the case where all the information cannot be displayed because volume of property information is high, the displayed content is scrolled using a scroll key provided for the designating device 90, and other information is displayed.

When the user pushes a clear button placed on the designating device 90 at subsequent S142 "Return? (Push down Clear Button)", advancement to S144 "Disconnect? (Button Having Handset Put thereon) is made.

Also, in the case where designation of not performing property display is made at S130, advancement to S146 "Transmit Image?" is made. At S146, whether or not the image of the selected current frame number is received from the electronic camera 10 and is transmitted to the server 120 and the like is determined. If the user designates transmission of the image, the program proceeds to S148 "Select Desired Number of Pixels". At S148, the user selects the desired number of pixels while seeing a number-of-pixels selection screen displayed on the display 88. Also, if transmission of the image data is not demanded at S146, advancement to S144 is made.

Figure 14:
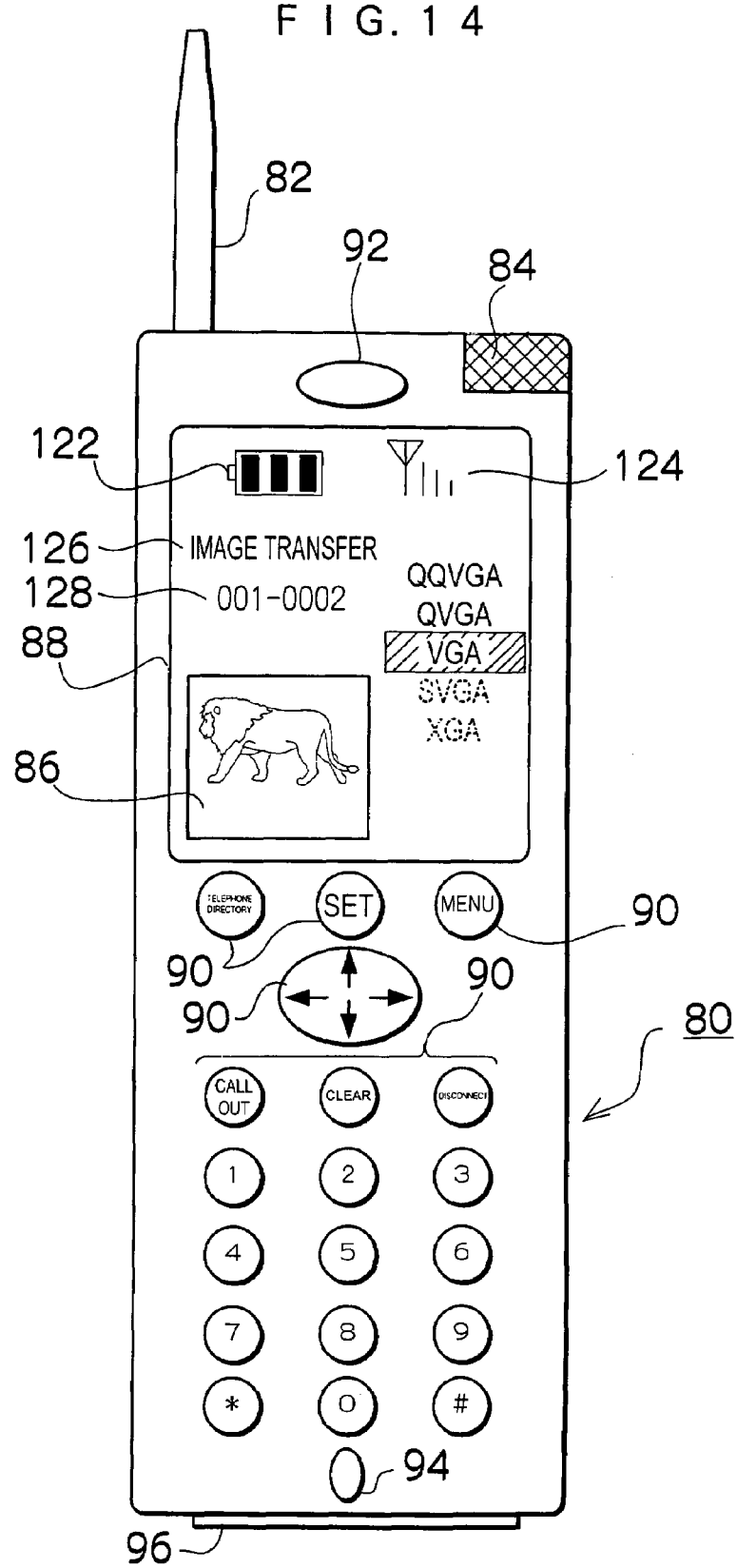
FIG. 14 shows an example of display by character representation of a screen for selecting the number of pixels of transferred image data in an image transfer menu.

An example of a number-of-pixels selection screen of transfer image data by character representation in an image transfer menu is shown in FIG. 14.

According to FIG. 14, the run mode display 126 representing a mode of "Image Transfer", the selected image directory file name 128 "001-0002", the thumbnail image 86 of the image file, and virtual directories such as "QQVGA", "QVGA" . . . provided in the hierarchy below the directory "ROOT" based on the received file list information are displayed on the display 88 of the communication device 80.

In the example of display of FIG. 14, since the image file "001-0002" is image data recorded in the VGA size, gray out display (represented by a dashed line in FIG. 14) showing that no virtual file name exists in the virtual directories of "SVGA" and "XGA" is provided. This gray out display represents a category that the user cannot select or a category that gives no benefits if selected. Therefore, in the case where the number of pixels of the image recorded in the original image file is the XGA size, the image file having all the resolutions of QQVGA to XGA can be selected.

Here, in the case where the user selects the desired number of pixels suitable for processing at a part to which transfer is made (for example, the virtual directory of "VGA") advancement to S150 "Request File of Desired Number of Pixels of Current Frame Number" is made, and the communication device 80 transmits (accesses) the selected virtual directory information (number-of-pixels information) to the electronic camera 10. In the case where the apparatus to which the image file is transmitted is a printer comprising printing means and is used for printing an image on a large sheet of paper with high resolution, a virtual file of a virtual directory with the number of pixels being large and the volume of data being high is selected. Also, in the case where the paper on which print is made is a sixteen part seal-type paper or the like, a virtual file recorded in a virtual directory with the number of pixels of the VGA size or so is selected.

Furthermore, in the case where the user wants to omit a process to designate a virtual directory one by one in accordance with an application, the communication device 80 may automatically select an image file with the largest number of pixels to perform image transfer. In this case, whether or not a corresponding image file exists in a directory is explored, in decreasing order with the directory of the largest number of pixels being the first, or the number of pixels of the original image file may be obtained from the property information recorded in the file of the property directory to obtain an image file from a directory matching the above described number of pixels.

When the electronic camera 10 receives the number-of-pixels information, image data is read from the designated image file and is subjected to decompression processing at S152 "Read File of Current Frame Number from Recording Medium". Then, at subsequent S154 "Produce Number-of-pixels Conversion File of Current Frame Number", processing to convert the read image data into the number of pixels corresponding to the received number-of-pixels information is performed. The image file converted into the predetermined number of pixels may be newly recorded in the recording medium 54, or may be recorded in the frame memory 48 or the memory 58. Also, in the case where the number-of-pixels information received is identical to the number of pixels recorded in the recording medium 54 (in the case where the recorded image data is of VGA size, and the received image information is of VGA size, as in this example), the recorded image data is transmitted to the communication device 80 without performing number-of-pixels conversion processing. Furthermore, in this example, converted image production processing to make a change to the original image with respect to parameters concerning the property of the image such as the number of pixels of the image, sampling processes and color information for producing a new image file is performed by the information processing device 44. Also, change of the compression rate of image data, converted image production processing to change the recording pattern of image data for producing a new image file, and so on may be performed by the dedicated compressing and decompressing device 52.

At S156 "File of Desired Number of Pixels of Current Frame Number", the data of the image file produced at S154 is transmitted to the communication device 80. Then, after temporarily recording the image data received through the wireless communication device 84 and the transmitting device 102 in the transmission and reception buffer 104 or the RAM 110, the communication device 80 performs processing to transmit the data of the image file to the base station (server 120) or another communication device such as a printer through the transmitting and receiving device 100, the wireless communication device 98 and the public circuit at S158 "Transmit Obtained File to Base Station". And, when the above described transmission processing is completed, advancement to S144 is made.

At S144, whether or not the communication between the communication device 80 and the electronic camera 10 is disconnected is determined. If reception of image data and browsing of images are performed again, return to S128 is made, and if the communication is disconnected, a command to disconnect the communication with the electronic camera 10 is transmitted at S160 "Request Disconnection" and advancement to S162 "Termination" is made.

In the electronic camera 10, the received "Request Disconnection" is accepted to proceed to S164 "Termination" and the communication processing is terminated.

Furthermore, although not shown in processing procedures of communication of FIG. 12, in the case where an image for confirmation is displayed on the display 88 of the communication device 80, the communication device 80 makes a request of the electronic camera 10 for image data with the number of pixels suitable for the number of pixels displayed on the display 88. For example, in the case where the number of pixels displayed in the image display frame of the display 88 is QVGA (320×240 pixels), the communication device 80 transmits "Request QVGA Image" to the electronic camera 10.

In the electronic camera 10, image data is read from the recording medium and is subjected to decompression processing, and processing to produce image data of the "QVGA" size is performed. The QVGA image data of the current frame obtained in this way is transmitted to the communication device 80, and the QVGA image of the current frame number is displayed on the display 88.

Figure 15:
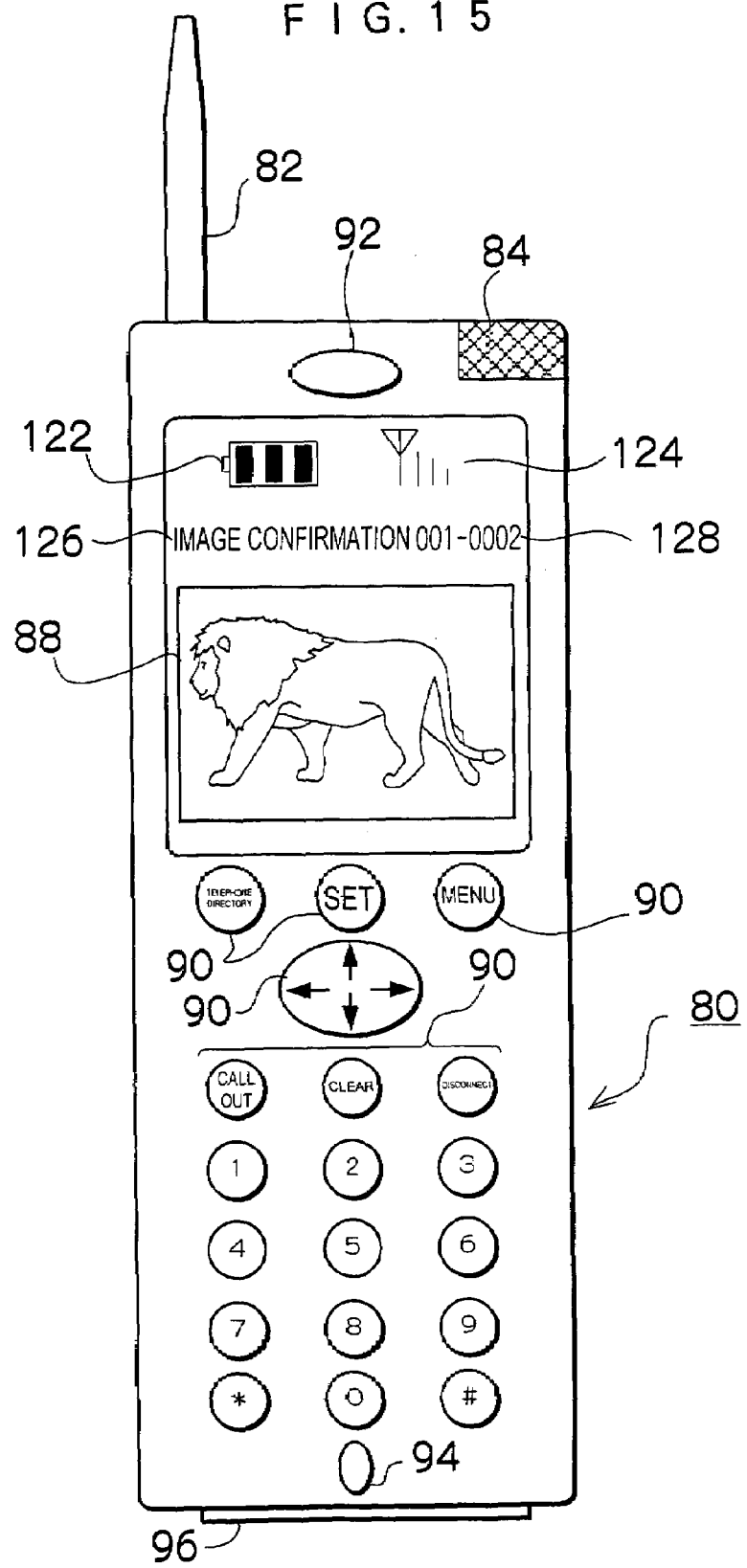
FIG. 15 shows an example of display of a confirmation image.

An example of the display of a confirmation image is shown in FIG. 15.

According to FIG. 15, the run mode display 126 representing a mode of "Image Confirmation", the selected image directory file name 128 "001-0002", and the QVGA image of the extension image file for image confirmation are displayed on the display 88 of the communication device 80. This displayed QQVGA image is image data obtained by the communication device 80 by designating the virtual directory name and virtual file name from the directory below (¥ROOT) ¥QVGA. In this way, an image with the volume of information larger than that of the thumbnail image is displayed, thereby allowing the user to confirm the image more closely.

In the aforesaid embodiment, production of a virtual image file different from the recorded image data in the number of pixels is described as an example, but the present invention should not be limited thereto, and virtual image data associated with the compression rate of the recorded image data may be produced as shown below, or a virtual file corresponding to the volume of the image data of the image file may be produced.

Figure 16:
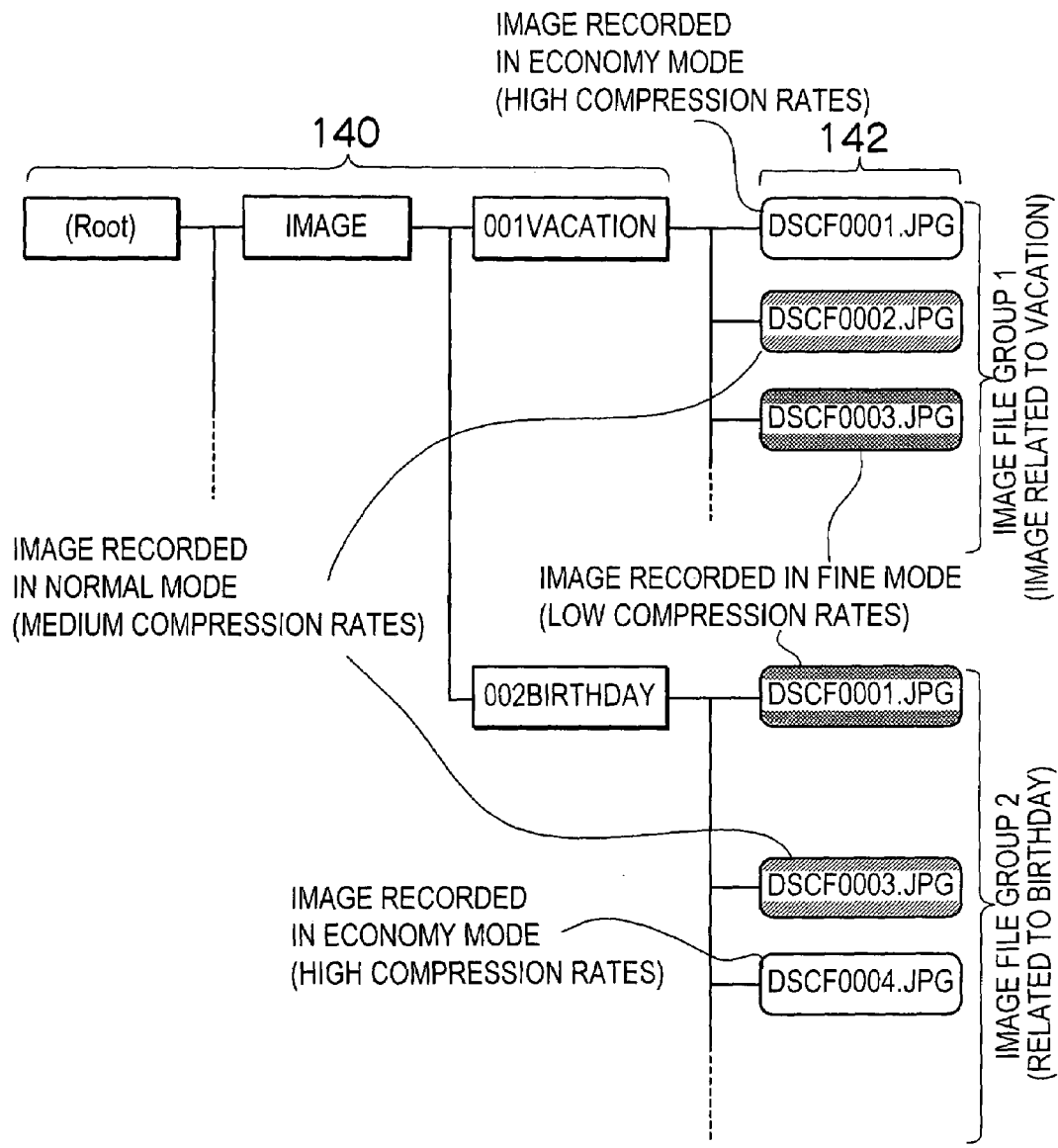
FIG. 16 shows another embodiment of the directory structure of original images recorded in the recording medium of the electronic camera.

Another embodiment of the directory structure of the original image data recorded in the recording medium 54 of the electronic camera 10 is shown in FIG. 16.

According to FIG. 16, the directory structure of image data is configured by a directory group 140 of directories "ROOT", "IMAGE" representing image data, "001VACATION" representing images captured by the user during his or her vacation, and "002BIRTHDAY", and an image file group 142 of image files "DSCF0001.JPG", "DSCF0002.JPG" and the like.

Of the image files in the hierarchy below the directory "001VACATION" shown in FIG. 16, "DSCF0001.JPG" is an image file recorded in a "Economy" mode of high compression rates, "DSCF0002.JPG" is an image file recorded in a "Normal" mode of medium compression rates, and "DSCF0003.JPG" is an image file recorded in a "Fine" mode of low compression rates.

In a similar way, of the image files in the hierarchy below the directory "002BIRTHDAY", "DSCF0001.JPG" is an image file recorded at a low compression rate, "DSCF0002.JPG" is unassigned, "DSCF0003.JPG" is an image file recorded at a medium compression rate, and "DSCF0004.JPG" is an image file recorded at a high compression rate.

Virtual directories and virtual files newly produced in accordance with the compression rate of image data are shown in tree representation in FIG. 17.

According to FIG. 17, in the hierarchy below the directory "ROOT", a virtual directory "Economy" storing a series of virtual image files with the compression rate of "Economy", a virtual directory "Normal" storing a series of virtual image files with the compression rate of "Normal", and a virtual directory "Fine" storing a series of virtual image files with the compression rate of "Fine" are newly produced.

Also, hierarchy below the newly produced directories, directories "001VACATION" and "002BIRTHDAY" classified by the user are newly produced. And, in the hierarchy below the directories "001VACATION" and "002BIRTHDAY", virtual image files "DSCF0001.JPG", "DSCF0002.JPG", "DSCF0003.JPG" . . . are further produced. These virtual directories and virtual files are directories and files that do not exist in reality, but if the processing speed of the information processing device 44 is high and the recording medium 54 has sufficient space, image files with the number of pixels converted may be produced from original image files and recorded with the directory structure shown in FIG. 17.

As shown in FIG. 17, the virtual file "DSCF0001.JPG" does not exist in the directory "001VACATION" in the hierarchy below the virtual directory "Normal". This is for the purpose of preventing consciously the number of pixels bringing about higher volume than original image data from being produced, because the image file recorded when photo shooting is performed is image data recorded in the "Economy" mode (the image file "DSCF0001.JPG" in the directory "001VACATION" is recorded in the "Economy" mode, as shown in FIG. 16), and therefore increasing the volume of the image data and transmitting the image data when the image data is transmitted through communication results in waste. Thus, in a similar way, the virtual file of the image file recorded in the "Normal" mode is not produced in the directory "FINE".

Figure 18:
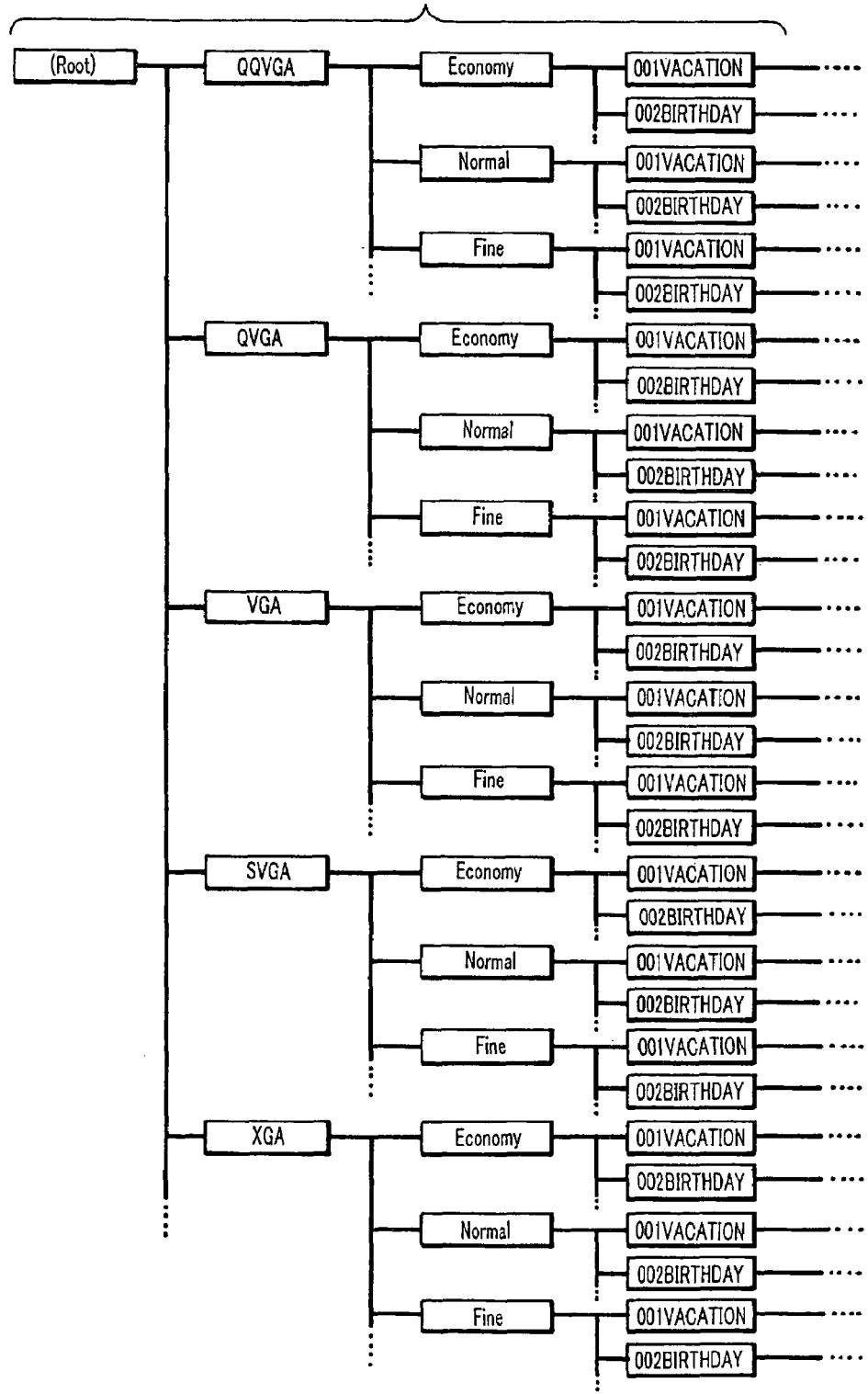
FIG. 18 shows virtual directories and virtual files newly produced in accordance with the number of pixels of images and the compression rate of images.

FIG. 18 shows virtual directories and virtual files produced in accordance with the number of pixels of the image and the compression rate of the image in tree representation.

According to FIG. 18, in the hierarchy below the directory "ROOT", virtual directories "QQVGA", "QVGA" . . . produced in accordance with the number of pixels are provided. Also, in the hierarchy below these virtual directories produced in accordance with the number of pixels, virtual directories "Economy", "Normal" . . . produced in accordance with the compression rate of the image are produced. Also, in the hierarchy below these virtual directories produced in accordance with the compression rate of the image, virtual directories of the directories "001VACATION" and "002BIRTHDAY" for the purpose of classification by the user are newly produced. And, in the hierarchy below the aforesaid virtual directories "001VACATION" and "002BIRTHDAY", virtual image files "DSCF0001.JPG", "DSCF0002.JPG", "DSCF0003.JPG" . . . (not shown) are produced. These virtual directories and virtual files are directories and files that do not exist in reality, but if the processing speed of the information processing device 44 is high and the recording medium 54 has sufficient space, image files with the number of pixels converted may be produced from original image files and classified recorded with the directory structure shown in FIG. 18.

File list information classified and produced as described above is transmitted to the communication device 80 and is displayed on the display 88 of the communication device 80, thereby allowing the user to select and obtain a desired kind of image in accordance with an application quickly. Also, there is an advantage that a burden on the processing program of the communication device 80 can be reduced because the communication device 80 does not need to have information in advance with respect to a plurality of image files recorded in the recording medium of the image information transmitting apparatus.

Also, because the image information transmitting apparatus produces virtual directories and classifies two or more kinds of virtual image files that are different from each other in the number of pixels and the like, the communication device 80 only comprises a program for viewing files that is widely used on a normal basis, thereby allowing selection and designation of two or more kinds of virtual image files. And, also for a processing program of the communication device 80, a tool that the user frequently uses on a normal basis and he or she is familiar with may be used, thus making it possible to reduce a burden and achieve comfortable operability.

Also, the image information transmitting apparatus may be configured such that a power-conservation mode in which no operation is performed is set in normal times, and the above described power-conservation mode is released to start communication and information processing when a command of "Request Connection" is received from the communication device 80. Configuration is performed in this way, thereby making it possible to start the image information transmitting apparatus from the stand-by mode only when necessary and reduce power consumption to prolong the lifetime of batteries.

In the aforesaid embodiment, the image information transmitting apparatus has been described as an electronic camera comprising the imaging device as an example, but the present invention should not be limited to electronic cameras and may adopt scanners having an imaging device.

Also, in the aforesaid embodiment, it has been described that the communication device 80 performs wireless communication with other communication devices by way of public circuits using a wireless communicating device, as an example, but the present invention should not be limited to wireless communication, and may adopt a communicating device using cables or a communicating device performing communication with wired communications network.

Also, in the aforesaid embodiment, cases in which image files that the information processing device 44 newly produces are image files with compression rates of image data changed and image files with the number of pixels changed relative to original image files have been described, but the present invention should not be limited thereto, and image files with tones changed, image files subjected to sampling conversion of YCC420 and YCC422 for conversion to brightness signals and color differential signals, image files subjected to RGB conversion for conversion to three process colors of red, green and blue, image files subjected to monochrome conversion, image files subjected to sepia color conversion, files of different image record patterns may be newly produced, or these virtual directories and virtual files may be newly produced as image information that is newly produced.

Also, virtual files of color images may be designated automatically if the display 88 of the communication device 80 is a display capable of performing color representation, and virtual files of monochrome images may be designated automatically if the display 88 is a display comprising only the function of monochrome representation, so that burdens with respect to user's operation may be reduced.

Also, the communication device (such as the image information receiving apparatus) described above may be portable communication terminal equipment, or a simple communication device as represented by a remote control.

As described above, according to the image information obtaining method related to the present invention, the image information transmitting end classifies a plurality of images for each parameter representing the property of the image, produces directories to register image files or file names of the classified images for the each parameter, and registers the file names required, and the image information receiving end selects a desired image file of a desired parameter according to the information of the produced directories, and receives an image of the selected desired image file of the desired parameter from the image information transmitting end, thereby allowing the user to easily select and designate a desired image file in accordance with a specific application by remote operation from the image information receiving apparatus on the basis of the information of directories presented by the image information transmitting apparatus.

Also, according to the image information transmitting apparatus related to the present invention, the directory producing device for classifying a plurality of images recorded in record medium for each parameter representing the property of the image, producing directories to register image files or file names of the classified images, and registering the file names required, the communicating device capable of performing transmission and reception of information with the image information receiving apparatus, and the information processing device that, when it is requested from the image information receiving apparatus through the communicating device that any image file produced by the directory producing device be provided, has images of the requested image file transmitted to the image information receiving apparatus through the communication device are provided, thus allowing the user to easily select and designate a desired image file in accordance with a specific application by remote operation from the image information receiving apparatus on the basis of the information of directories presented by the image information transmitting apparatus.

Also, in particular, in the case where the image information transmitting apparatus and the image information receiving apparatus are connected with wireless communication, the user can operate the image information receiving apparatus alone to obtain image files (a pull model or a get model is formed), thus eliminating the need to perform direct operation to the image information transmitting apparatus. Therefore, even if the image information transmitting apparatus is encased in a bag, for example, the user can operate the image information receiving apparatus alone to obtain image files recorded in the image information transmitting apparatus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image information obtaining method in which an image information receiving end can select a desired image file according to information about directories presented by an image information transmitting end and receives an image of the selected image file, said method comprising:
   at the image information transmitting end:
      classifying a plurality of images recorded in a recording medium under parameters that represent properties of the plurality of images, each image having a plurality of parameters associated therewith;
      producing directories in which to register image files or file names of the classified images in each parameter associated with images; and
      registering file names as required for each image, wherein a file name for each image is registered under each directory for which any specific parameter applies to said image, said plurality of parameters associated with said image thereby allowing said image to be registered under a corresponding plurality of directories; and
   at the image information receiving end:
      providing a display of at least a portion of a hierarchical tree structure in accordance with said directories, from which can be selected a desired image file of a desired parameter according to the information about the directories produced by said image information transmitting end; and
      receiving an image of the selected desired image file of the desired parameter from the image information transmitting end, wherein said desired image file can be retrieved from any said directory in said hierarchical tree structure for which a specific parameter for said desired image file applies.

2. The image information obtaining method as defined in claim 1, wherein the plurality of images includes an original image and a converted image produced from the original image by changing a parameter representing a property of the original image.

3. The image information obtaining method as defined in claim 2, wherein the image information transmitting end produces the converted image from the original image recorded in the recording medium by changing the parameter and registers the converted image or a file name of the converted image in the produced directory.

4. The image information obtaining method as defined in claim 2, wherein the image information transmitting end transmits the converted image produced from the original image by changing the parameter if an image file of an image whose parameter is different from the parameter of the original image is accessed from the image information receiving end.

5. The image information obtaining method as defined in any one of claims 2, 3 and 4, wherein the image information transmitting end does not register an image file whose image data amount is not less than an image data amount of an original image file or a file name of the image file in the directories constructed for each parameter.

6. The image information obtaining method as defined in claim 2, wherein the image information transmitting end has a plurality of images whose parameters representing properties of the plurality of images are different in one image file of the original image, and transmits, if an image file with the same parameter as that of an image among the plurality of images in the image file of the original image is accessed from the image information receiving end, an image with the corresponding parameter among the plurality of images in the image file of the original image.

7. The image information obtaining method as defined in claim 1 or 2, wherein the parameters representing the properties of the images include at least one of a number of pixels, compression rate, sampling method and color information.

8. The method of claim 1, wherein the directories produced in the image information transmitting end to register image files or file names of the classified images in each parameter comprise virtual directories, wherein a virtual directory comprises a directory for which image data is converted upon a request for data from said virtual directory.

9. The method of claim 8, wherein the display in the image information receiving end of at least a portion of a hierarchical tree structure in accordance with the directories comprises a display of the virtual directories in addition to any existing directories already existing in the image information receiving end.

10. The method of claim 8, wherein the virtual directories are produced in the image information transmitting end in response to a request for a file list from the image information receiving end.

11. The method of claim 1, wherein:
   an image is associated hierarchically as a file in an existing folder, thereby establishing an existing file/folder relationship for said image; and
   at least one property parameter of said image provides a basis for a directory for said image that maintains said existing file/folder relationship.

12. An image information obtaining method in which an image information receiving end can select a property file to register property information of a desired image file in according to information about directories presented by an image information transmitting end and receives information of the selected property file, wherein:
   the image information transmitting end:

produces directories in which to register property files or property file names of image files recorded in a recording medium, each image having a plurality of properties associated therewith; and registers the property file names as required for each image, wherein each image is registered as a file in each directory having a specific property associated with said image, said plurality of properties associated with an image causing said image to be registered in each of a corresponding plurality of directories; and the image information receiving end:

provides a display of at least a portion of a hierarchical tree structure in accordance with said directories, from which can be selected a desired property file according to the information about the produced directories; and receives information of the selected desired property file from the image information transmitting end, wherein an image can be selectively retrieved from any directory associated with a property attributed to said image.

13. The image information obtaining method as defined in any one of claims 1, 2 and 12, wherein the directories include pass names or holders to which the image files or the property files belong.

14. The image information obtaining method as defined in any one of claims 1, 2 and 12, wherein the image information receiving end displays at least one of an image file name, an image directory name, a property file name, a property directory name, a pass name of the image file and a pass name of the property file according to the information about the directories presented by an apparatus at the image information transmitting end.

15. The image information obtaining method as defined in any one of claims 1, 2 and 12, wherein the image information receiving end displays the information about the directories in tree representation according to the information about the directories presented by the image information transmitting end.

16. The image information obtaining method as defined in any one of claims 1, 2 and 12, wherein the image information receiving end transmits and receives information to and from a communication apparatus other than the image information transmitting end through a public circuit or a communication network, and transmits the received image of the desired image file or the received information of the property file to the communication apparatus.

17. The image information obtaining method as defined in any one of claims 1, 2 and 12, wherein the image information transmitting end images a subject and records image data acquired by the imaging.

18. The image information obtaining method as defined in any one of claims 1, 2 and 12, wherein the transmission and reception of the information comprises at least one of:

connecting the image information transmitting end and the image information receiving end that transmits and receives the information with a cable and transmitting and receiving the information by wire communication by converting the information into electric signals or light signals; and transmitting and receiving the information by radio communication by converting the information into electric signals or light signals.

19. The image information obtaining method as defined in any one of claims 1, 2 and 12, wherein the image information receiving end is capable of transmitting and receiving information to and from a communication apparatus other than an image information transmitting apparatus that implements said image information obtaining method, through a public circuit or a communication network and transmitting and receiving speech signals.

20. The image information obtaining method as defined in any one of claims 1, 2 and 12, wherein the image information transmitting end sets a power-conservation mode in which power consumption of the image information transmitting end is reduced, and the image information transmitting end cancels the power-conservation mode when the image information transmitting end receives information from the image information receiving end while the power-conservation mode is set.

21. An image information transmitting apparatus comprising:

a directory producing device which classifies a plurality of images recorded in a recording medium under parameters that represent properties of the plurality of images, producing directories to register image files or file names of the classified images in for each parameter and registering file names required, wherein each image is associated with a plurality of parameters and an image appears as an image file or file name in each directory applicable for specific parameters associated with said image, so that each image is registered in each of a corresponding plurality of directories;

a communicating device capable of transmitting and receiving information to and from an image information receiving apparatus; and an information processing device which transmits, if the image information receiving apparatus asks for an offer of any image file produced by the directory producing device through the communicating device, an image of the image file to the image information receiving apparatus through the communicating device, wherein any image can be selectively retrieved from any directory in which said image is registered.

22. The image information transmitting apparatus as defined in claim 21, further comprising a converted image producing device which produces a converted image from an original image recorded in the recording medium by changing a parameter representing a property of the original image.

23. The image information transmitting apparatus as defined in claim 22, wherein the information processing device produces the converted image from the original image recorded in the recording medium by changing the parameter and registers the converted image or a file name of the converted image in the produced directory.

24. The image information transmitting apparatus as defined in claim 22, wherein the information processing device transmits the converted image produced from the original image recorded in the recording medium by changing the parameter to the image information receiving apparatus through the communicating device if an image file of an image whose parameter is different from the parameter of the original image is accessed from the image information receiving apparatus.

25. The image information transmitting apparatus as defined in any one of claims 12, 23 and 24, wherein the directory producing device does not register an image file whose image data amount is not less than an image data amount of an original image file or a file name of the image file in the directories constructed for each parameter.

26. The image information transmitting apparatus as defined in claim 22, wherein:

a plurality of images whose parameters representing properties of the plurality of images are different in one image file of the original image in the recording medium; and if the image information receiving apparatus asks for an offer of an image file with the same parameter as that of an image among the plurality of images in the image file of the original image through the communicating device, the information processing device transmits an image with the corresponding parameter among the plurality of images in the image file of the original image to the image information receiving apparatus through the communicating device.

27. The image information transmitting apparatus as defined in claim 21 or 22, wherein the directory producing device classifies the directories under parameters representing at least one of properties of the images that include a number of pixels, compression rate, sampling method and color information and produces the directories.

28. An image transmitting apparatus comprising:

a directory producing device which produces directories to register property files or property file names of image files recorded in a recording medium in and registering property file names required, wherein each image is associated with a plurality of properties and each said image file is listed in each directory for which a property of said image applies so that each image is listed in each of a corresponding plurality of directories;

a communicating device capable of transmitting and receiving information to and from an image information receiving apparatus; and an information processing device which transmits, if the image information receiving apparatus asks for an offer of any property file produced by the directory producing device through the communicating device, information about the properly file to the image information receiving apparatus through the communicating device, and any image can be selectively retrieved from any directory having a property associated with said image.

29. The image information transmitting apparatus as defined in any one of claims 21, 22 and 28, wherein the directory producing device produces pass names or holders to which the image files or the property files belong.

30. The image information transmitting apparatus as defined in any one of claims 21, 22 and 28, wherein:

the image information transmitting apparatus comprises one of a camera and a scanner having an imaging device which images a subject image; and the information processing device records image data acquired by the imaging to the recording medium.

31. The image information transmitting apparatus as defined in any one of claims 21, 22 and 28, wherein the communicating device comprises one of a wire communicating device with a cable and a wireless communicating device using carrier waves of radio waves or lights which connect the image information transmitting apparatus and the image information receiving apparatus that transmit and receive the information.

32. The image information transmitting apparatus as defined in any one of claims 21, 22 and 28, further comprising a power-conservation mode setting device which sets a power-conservation mode in which power consumption of the image information transmitting apparatus is reduced, the power-conservation mode setting device canceling the power-conservation mode when the communicating device receives information from the image information receiving apparatus while the power-conservation mode is set.

33. An image information transmitting system comprising:

an image information transmitting apparatus comprising:
a directory producing device which classifies a plurality of images recorded in a recording medium under parameters that represent properties of the plurality of images, produces directories to register image files or file names of the classified images in for each parameter and registers file names required and registers each image as appropriate in all directories associated with properties of said image, wherein each image is associated with a plurality of parameters so that each image is registered in a corresponding plurality of directories;

a communicating device capable of transmitting and receiving information to and from an image information receiving apparatus; and an information processing device which presents information about the produced directories to the image information receiving apparatus through the communicating device and transmits, if the image information receiving apparatus asks for an offer of any image file among the presented image files through the communicating device, an image of the image file to the image information receiving apparatus through the communicating device, wherein any image can be selectively retrieved from any directory associated with a property of said image; and the image information receiving apparatus comprising:
a first communicating device capable of transmitting and receiving information to and from the image information transmitting apparatus;

a display which displays the information about the produced directories presented by the image information transmitting apparatus; and a designating device which designates a desired image file of a desired parameter according to the displayed information about the directories.

34. The image information transmitting system as defined in claim 33, further comprising a converted image producing device which produces a converted image from an original image recorded in the recording medium by changing a parameter representing a property of the original image.

35. The image information transmitting system as defined in claim 34, wherein the information processing device registers the converted image or a file name of the converted image in the produced directory.

36. The image information transmitting system as defined in claim 34, wherein the information processing device transmits the converted image from the original image recorded in the recording medium by changing the parameter to the image information receiving apparatus through the communicating device if an image file of an image whose parameter is different from the parameter of the original image is accessed from the image information receiving apparatus.

37. The image information transmitting system as defined in any one of claims 34, 35 and 36, wherein the directory producing device does not register an image file whose image data amount is not less than an image data amount of an original image file or a file name of the image file in the directories constructed for each parameter.

38. The image information transmitting system as defined in claim 34, wherein:

a plurality of images whose parameters representing properties of the plurality of images are different in one image file of the original image in the recording medium; and if the image information receiving apparatus asks for an offer of an image file with the same parameter as that of an image among the plurality of images in the image file of the original image through the communicating device, the information processing device transmits an image with the corresponding among the plurality of images in the image file of the original image to the image information receiving apparatus through the communicating device.

39. The image information transmitting system as defined in claim 33 or 34, wherein the directory producing device classifies the directories under parameters representing at least one of properties of the images that include a number of pixels, compression rate, sampling method and color information and produces the directories.

40. An image information transmitting system comprising:

an image information transmitting apparatus comprising:
a directory producing device which produces directories to register property files or property file names of image files recorded in a recording medium in and registering property file names required, wherein each image is associated with a plurality of properties and each image is registered in each directory for which a property associated with said image applies, so that each image is registered in each of a corresponding plurality of directories;
a communicating device capable of transmitting and receiving information to and from an image information receiving apparatus; and
an information processing device which presents information about the produced directories to the image information receiving apparatus through the communicating device and transmits, if the image information receiving apparatus asks for an offer of any property file among the presented property files through the communicating device, information about the property file to the image information receiving apparatus through the communicating device; and the image information receiving apparatus comprising:
a first communicating device capable of transmitting and receiving information to and from the image information transmitting apparatus;
a display which displays the information about the produced directories presented by the image information transmitting apparatus; and
a designating device which designates a desired property file of a desired parameter according to the displayed information about the directories.

41. The image information transmitting system as defined in any one of claims 33, 34 and 40, wherein the directory producing device produces pass names or holders to which the image files or the property files belong.

42. The image information transmitting system as defined in any one of claims 33, 34 and 40, wherein the display displays at least one of an image file name, an image directory name, a property file name, a property directory name, a pass name of the image file and a pass name of the property file according to the information about the directories presented by the image information transmitting apparatus.

43. The image information transmitting system as defined in any one of claims 33, 34 and 40, wherein the display displays the information about the directories in tree representation according to the information about the directories presented by the image information transmitting apparatus.

44. The image information transmitting system as defined in any one of claims 33, 34 and 40, wherein the image information receiving apparatus further comprises a second communicating device capable of transmitting and receiving information to and from a communication apparatus other than the image information transmitting apparatus through a public circuit or a communication network, the second communicating device transmitting the received image of the desired image file or the received information of the property file to the communication apparatus.

45. The image information transmitting system as defined in any one of claims 33, 34 and 40, wherein:
the image information transmitting apparatus comprises one of a camera and a scanner having an imaging device which images a subject; and
the information processing device records image data acquired by the imaging to the recording medium.

46. The image information transmitting system as defined in any one of claims 33, 34 and 40, wherein the communicating device comprises one of a wire communicating device with a cable and a wireless communicating device using carrier waves of radio waves or lights which connect the image information transmitting apparatus and the image information receiving apparatus that transmits and receives the information.

47. The image information transmitting system as defined in claim 44, wherein the second communicating device is capable of transmitting and receiving information to and from a communication apparatus other than the image information transmitting apparatus through the public circuit or the communication network and transmitting and receiving speech signals.

48. The image information transmitting system as defined in any one of claims 33, 34 and 40, further comprising a power-conservation mode setting device which sets a power-conservation mode in which power consumption of the image information transmitting apparatus is reduced, the power-conservation mode setting device canceling the power-conservation mode when the communicating device receives information from the image information receiving apparatus while the power-conservation mode is set.

49. A signal-bearing medium tangibly embodying a program of machine-readable instructions executable by a digital processing apparatus to perform at least a portion of a method in which an image information receiving end can select a desired image file according to information about directories presented by an image information transmitting end and receives an image of the selected image file, said method comprising:

at the image information transmitting end:
classifying a plurality of images recorded in a recording medium under parameters that represent properties of the plurality of images;
producing one or more directories in which to register image files or file names of the classified images in each parameter; and
registering file names as required for each image, each said image registered in all directories as applicable, based on specific properties of said image, wherein each image is associated with a plurality of properties so that each image is registered in a corresponding plurality of directories; and at the image information receiving end:
  providing a display of at least a portion of a hierarchical tree structure in accordance with said directories, from which can be selected a desired image file of a desired parameter according to the information about the directories produced by said image information transmitting end and an image is selectively retrievable from any directory in which a property of said image is registered; and
  receiving an image of the selected desired image file of the desired parameter from the image information transmitting end,
wherein said program of machine-readable instructions executable by a digital processing apparatus tangibly embodied by said signal-bearing medium comprises at least one of:
a program of transmitter modules for an image information transmitting apparatus to execute said method, said transmitter modules comprising:
  a directory producing module which produces said directories;
  a communicating module capable of transmitting and receiving information to and from an image information receiving apparatus; and
  an information processing module which transmits, if the image information receiving apparatus asks for an offer of any property file produced by the directory producing device through the communicating module, information about the property file to the image information receiving apparatus through the communicating module; and
a program of receiver modules for an image information receiving apparatus to execute said method, said receiver modules comprising:
  a communicating module capable of transmitting and receiving information to and from the image information transmitting apparatus,
  a display module which provides, for a display device in said receiving apparatus, information about the produced directories transmitted by the image information transmitting apparatus, and
  a designating module which permits a desired image file of a desired parameter according to the displayed information about the directories to be designated.

* * * * *

UNITED STATES PATENT AND TRADEMARK OFFICE
CERTIFICATE OF CORRECTION

PATENT NO. : 7,265,780 B2  
APPLICATION NO. : 09/784159  
DATED : September 4, 2007  
INVENTOR(S) : Hiroshi Tanaka and Jan Grönholm Page 1 of 1

It is certified that error appears in the above-identified patent and that said Letters Patent is hereby corrected as shown below:

On the title page item (73), add additional Assignee

-- NOKIA MOBILE PHONES LIMITED --.

Signed and Sealed this

Seventh Day of October, 2008

JON W. DUDAS  
*Director of the United States Patent and Trademark Office*